US012793463B2

(12) United States Patent
Mu

(10) Patent No.: US 12,793,463 B2
(45) Date of Patent: Nov. 10, 2026

(54) FINGERPRINT UNLOCKING METHOD, ELECTRONIC DEVICE, READABLE STORAGE MEDIUM, AND CHIP

(71) Applicant: Honor Device Co., Ltd., Shenzhen (CN)

(72) Inventor: Weihu Mu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/992,742

(22) PCT Filed: Apr. 19, 2023

(86) PCT No.: PCT/CN2023/089316
§ 371 (c)(1),
(2) Date: Jan. 9, 2025

(87) PCT Pub. No.: WO2024/021696
PCT Pub. Date: Feb. 1, 2024

(65) Prior Publication Data

US 2025/0329188 A1 Oct. 23, 2025

(30) Foreign Application Priority Data

Jul. 29, 2022 (CN) ......................... 202210908805.0

(51) Int. Cl.
*G06V 40/13* (2022.01)
*G06F 3/041* (2006.01)
(Continued)

(52) U.S. Cl.
CPC ........ *G06V 40/1318* (2022.01); *G06F 3/0418* (2013.01); *G06F 21/32* (2013.01);
(Continued)

(58) Field of Classification Search
CPC .............. G06V 40/1318; G06V 10/141; G06F 3/0418; G06F 21/32; G09G 3/3406; G09G 3/36; G09G 2354/00
See application file for complete search history.

(56) References Cited

U.S. PATENT DOCUMENTS

2017/0316250 A1* 11/2017 Roh ...................... G06F 3/0412
2019/0251329 A1* 8/2019 Jiang .................. G06V 40/1365
(Continued)

FOREIGN PATENT DOCUMENTS

CN 106126998 A 11/2016
CN 107015703 A 8/2017
(Continued)

*Primary Examiner* — Premal R Patel
(74) *Attorney, Agent, or Firm* — Slater Matsil, LLP

(57) ABSTRACT

This application discloses a fingerprint unlocking method, an electronic device, a readable storage medium, and a chip, and pertains to the field of terminal technologies. The method is applied to an electronic device, and the method includes: generating an interrupt instruction and detecting a touch area of a touch operation in response to the touch operation on a fingerprint recognition region in a touchscreen of the electronic device; controlling, in response to the interrupt instruction, the touchscreen to perform an initialization operation; illuminating a backlight of the electronic device when initialization on the touchscreen is completed and the touch area is greater than or equal to an area threshold; and controlling, when the backlight is illuminated, the electronic device to perform a fingerprint unlocking operation.

20 Claims, 15 Drawing Sheets

(51) Int. Cl.

| | |
|---|---|
| ***G06F 21/32*** | (2013.01) |
| ***G06V 10/141*** | (2022.01) |
| *G09G 3/34* | (2006.01) |
| *G09G 3/36* | (2006.01) |

(52) U.S. Cl.
CPC ......... *G06V 10/141* (2022.01); *G09G 3/3406* (2013.01); *G09G 3/36* (2013.01); *G09G 2354/00* (2013.01)

(56) References Cited

U.S. PATENT DOCUMENTS

| | | | | |
|---|---|---|---|---|
| 2019/0354226 | A1* | 11/2019 | Choi | G06F 1/3231 |
| 2019/0354661 | A1* | 11/2019 | Lu | G06F 21/84 |
| 2021/0004561 | A1* | 1/2021 | Xu | G06V 40/1318 |
| 2021/0027037 | A1* | 1/2021 | Xu | G09G 5/10 |
| 2021/0056333 | A1* | 2/2021 | Cheng | G06V 40/1318 |
| 2021/0342568 | A1* | 11/2021 | Huang | G06F 3/041 |

FOREIGN PATENT DOCUMENTS

| | | | |
|---|---|---|---|
| CN | 108810252 | A | 11/2018 |
| CN | 110059464 | A | 7/2019 |
| CN | 110348191 | A | 10/2019 |
| CN | 111382404 | A | 7/2020 |
| CN | 113361305 | A | 9/2021 |
| JP | 2017215842 | A | 12/2017 |
| TW | I766504 | B | 6/2022 |

* cited by examiner

TO FIG. 11B
TO FIG. 11B
TO FIG. 11B
TO FIG. 11B
TO FIG. 11B

FINGERPRINT UNLOCKING METHOD, ELECTRONIC DEVICE, READABLE STORAGE MEDIUM, AND CHIP

CROSS-REFERENCE TO RELATED APPLICATIONS

This application is a national stage of International Application No. PCT/CN2023/089316, filed on Apr. 19, 2023, which claims priority to Chinese Patent Application No. 202210908805.0, filed on Jul. 29, 2022, both of which are incorporated herein by reference in their entireties.

TECHNICAL FIELD

This application relates to the field of terminal technologies, and in particular, to a fingerprint unlocking method, an electronic device, a readable storage medium, and a chip.

BACKGROUND

As people increasingly depend on an electronic device, more user information is recorded in the electronic device. The user information is related to property, privacy, and the like of a user. Therefore, the user imposes an increasingly high requirement on security of the electronic device. To ensure security of the electronic device, various types of unlocking verification such as fingerprint unlocking verification may be generally set for the electronic device.

In a fingerprint unlocking process, the electronic device needs to illuminate a liquid crystal display (liquid crystal display, LCD) screen, collect fingerprint information in a fingerprint recognition region, perform fingerprint recognition verification based on the fingerprint information, and perform unlocking after the fingerprint verification succeeds. For this series of operations, how to improve fingerprint unlocking efficiency becomes a problem that needs to be urgently resolved.

SUMMARY

This application provides a fingerprint unlocking method, an electronic device, a readable storage medium, and a chip, so that a problem, in a related technology, of how to improve fingerprint unlocking efficiency can be resolved. The technical solutions are as follows:

According to a first aspect, a fingerprint unlocking method is provided, and is applied to an electronic device, where the method includes:

- generating an interrupt instruction and detecting a touch area of a touch operation in response to the touch operation on a fingerprint recognition region in a touchscreen of the electronic device;
- controlling, in response to the interrupt instruction, the touchscreen to perform an initialization operation;
- illuminating a backlight of the electronic device when initialization on the touchscreen is completed and the touch area is greater than or equal to an area threshold; and
- controlling, when the backlight is illuminated, the electronic device to perform a fingerprint unlocking operation.

In this way, in a fingerprint unlocking process, when the touch operation is detected, the touchscreen may be directly controlled, in response to the interrupt instruction, to perform the initialization operation, so that the initialization operation on the touchscreen and the operation of detecting the touch area are performed at the same time, thereby shortening fingerprint unlocking duration, and improving fingerprint unlocking efficiency.

As an example of this application, the illuminating a backlight of the electronic device when initialization on the touchscreen is completed and the touch area is greater than or equal to an area threshold includes:

- when initialization on the touchscreen is completed and the touch area is greater than or equal to the area threshold, illuminating a backlight in a preset region, where the preset region is at least one of the fingerprint recognition region and a frame region of the electronic device.

In this way, the backlight of the electronic device is selectively illuminated, so that diversity of a backlight function is improved. In addition, because the screen of the electronic device does not need to be illuminated, power waste is reduced.

As an example of this application, the electronic device includes a touchscreen touch module and a touchscreen controller; and

- the generating an interrupt instruction and detecting a touch area of a touch operation in response to the touch operation on a fingerprint recognition region in a touchscreen of the electronic device includes:
- in response to the touch operation on the fingerprint recognition region in the touchscreen, generating, by the touchscreen touch module, the interrupt instruction, and detecting the touch area of the touch operation; and
- sending, by the touchscreen touch module, the interrupt instruction to the touchscreen controller.

In this way, when detecting the touch operation, the touchscreen touch module may send the interrupt instruction to the touchscreen controller, so that an occasion of sending the interrupt instruction is advanced, and an unlocking speed is increased.

As an example of this application, the controlling, in response to the interrupt instruction, the touchscreen to perform an initialization operation includes:

- when receiving the interrupt instruction, performing, by the touchscreen controller, an initialization operation on the touchscreen in response to the interrupt instruction.

In this way, in a process in which the touchscreen touch module detects whether the touch area is greater than or equal to the area threshold, the touchscreen controller can perform the initialization operation on the touchscreen at the same time, thereby shortening time of waiting for the initialization operation on the touchscreen, and increasing a fingerprint unlocking speed.

As an example of this application, after the generating an interrupt instruction and detecting a touch area of a touch operation in response to the touch operation on a fingerprint recognition region in a touchscreen of the electronic device, the method further includes:

- when the touch area is less than the area threshold, sending, by the touchscreen touch module, a touch failure message to the touchscreen controller; and
- when receiving the touch failure message, stopping, by the touchscreen controller, the initialization operation on the touchscreen if the initialization operation on the touchscreen is not completed.

In this way, the touch failure message is sent to the touchscreen controller, so that fingerprint recognition is avoided in case of accidental touch by a user, thereby improving fingerprint recognition reliability.

As an example of this application, the electronic device further includes a fingerprint module and a display module; and the illuminating a backlight of the electronic device when initialization on the touchscreen is completed and the touch area is greater than or equal to an area threshold includes:

when initialization on the touchscreen is completed, sending, by the touchscreen controller, an initialization complete message to the display module;

when the touch area is greater than or equal to the area threshold, sending, by the touchscreen touch module, a touch complete message to the display module by using the fingerprint module; and when receiving the initialization complete message and the touch complete message, illuminating, by the display module, the backlight.

In this way, the backlight is illuminated by responding to the initialization complete message and the touch complete message, so that it is ensured that the backlight is illuminated when the touch operation is not a misoperation and the touchscreen meets a fingerprint recognition condition, thereby improving fingerprint recognition reliability.

As an example of this application, after the generating an interrupt instruction and detecting a touch area of a touch operation in response to the touch operation on a fingerprint recognition region in a touchscreen of the electronic device, the method further includes:

when the touch area is less than the area threshold, separately sending, by the touchscreen touch module, a touch failure message to the touchscreen controller and the fingerprint module;

when receiving the touch failure message, stopping, by the touchscreen controller, the initialization operation on the touchscreen if the initialization operation on the touchscreen is not completed; and when receiving the touch failure message, skipping making, by the fingerprint module, any response.

In this way, the touch failure message is separately sent to the touchscreen controller and the fingerprint module, so that it is ensured that fingerprint recognition can be avoided in different manners in case of accidental touch by a user, thereby improving reliability of preventing fingerprint misrecognition.

As an example of this application, the controlling, when the backlight is illuminated, the electronic device to perform a fingerprint unlocking operation includes:

collecting fingerprint information in the fingerprint recognition region when the backlight is illuminated;

performing fingerprint verification based on the fingerprint information; and controlling, based on a current state of the electronic device when the fingerprint verification succeeds, the electronic device to perform an operation corresponding to a fingerprint unlocking function.

In this way, when the electronic device is in different states, the electronic device is controlled to perform different operations, thereby improving an application range and application richness of fingerprint unlocking.

As an example of this application, before the collecting fingerprint information in the fingerprint recognition region when the backlight is illuminated, the method further includes:

recognizing a type of the touch operation; and when the type of the touch operation is a touch operation for fingerprint recognition, performing the operation of collecting fingerprint information in the fingerprint recognition region when the backlight is illuminated.

In this way, it is determined whether the touch operation is a touch operation for fingerprint recognition, thereby avoiding a misoperation of fingerprint recognition, and improving fingerprint recognition reliability.

As an example of this application, the controlling, based on a current state of the electronic device when the fingerprint verification succeeds, the electronic device to perform an operation corresponding to the fingerprint unlocking function includes:

when the fingerprint verification succeeds, if the electronic device is currently in a screen to-be-unlocked state, unlocking a screen of the electronic device;

when the fingerprint verification succeeds, if the electronic device is currently in a resource to-be-paid state, performing a resource payment operation;

when the fingerprint verification succeeds, if the electronic device is currently in an account to-be-logged-in state, performing an account login operation; or when the fingerprint verification succeeds, if the electronic device is currently in an application lock to-be-unlocked state, unlocking an application lock of a target application to display an application interface of the target application, where the target application is any application installed on the electronic device, the target application is set with the application lock and is currently in a to-be-started state, and the application lock is used to encrypt startup of the target application.

In this way, a screen unlocking function, a resource payment function, an account login function, an application lock function, and the like of the electronic device can be implemented through fingerprint unlocking, thereby improving an application range and application richness of fingerprint unlocking.

As an example of this application, the detecting a touch area of the touch operation includes:

detecting a quantity of touch sensors touched by the touch operation in the fingerprint recognition region; and when the quantity of touch sensors is greater than or equal to a quantity threshold, determining that the touch area of the touch operation is greater than or equal to the area threshold.

In this way, the quantity of touch sensors triggered in the fingerprint recognition region is detected, so that it can be determined whether the touch area is greater than or equal to the area threshold, thereby reducing complexity of detecting the touch area, and improving detection efficiency.

According to a second aspect, an electronic device is provided, where a structure of the electronic device includes a processor and a memory, and the memory is configured to: store a program that supports the electronic device in performing the fingerprint unlocking method provided in the first aspect, and store data used to implement the fingerprint unlocking method according to the first aspect. The processor is configured to perform the program stored in the memory. The electronic device may further include a communication bus, and the communication bus is configured to establish a connection between the processor and the memory. The processor is configured to:

generate an interrupt instruction and detect a touch area of a touch operation in response to the touch operation on a fingerprint recognition region in a touchscreen of the electronic device;

control, in response to the interrupt instruction, the touchscreen to perform an initialization operation;

illuminate a backlight of the electronic device when initialization on the touchscreen is completed and the touch area is greater than or equal to an area threshold; and control, when the backlight is illuminated, the electronic device to perform a fingerprint unlocking operation.

As an example of this application, the processor is further configured to:

when initialization on the touchscreen is completed and the touch area is greater than or equal to the area threshold, illuminate a backlight in a preset region, where the preset region is at least one of the fingerprint recognition region and a frame region of the electronic device.

As an example of this application, the electronic device includes a touchscreen touch module and a touchscreen controller, and the processor is further configured to:

in response to the touch operation on the fingerprint recognition region in the touchscreen, generate, by the touchscreen touch module, the interrupt instruction, and detect the touch area of the touch operation; and send, by the touchscreen touch module, the interrupt instruction to the touchscreen controller.

As an example of this application, the processor is further configured to:

when receiving the interrupt instruction, perform, by the touchscreen controller, an initialization operation on the touchscreen in response to the interrupt instruction.

As an example of this application, the processor is further configured to:

when the touch area is less than the area threshold, send, by the touchscreen touch module, a touch failure message to the touchscreen controller; and when receiving the touch failure message, stop, by the touchscreen controller, the initialization operation on the touchscreen if the initialization operation on the touchscreen is not completed.

As an example of this application, the electronic device further includes a fingerprint module and a display module; and the processor is further configured to:

when initialization on the touchscreen is completed, send, by the touchscreen controller, an initialization complete message to the display module;

when the touch area is greater than or equal to the area threshold, send, by the touchscreen touch module, a touch complete message to the display module by using the fingerprint module; and when receiving the initialization complete message and the touch complete message, illuminate, by the display module, the backlight.

As an example of this application, the processor is further configured to:

when the touch area is less than the area threshold, separately send, by the touchscreen touch module, a touch failure message to the touchscreen controller and the fingerprint module;

when receiving the touch failure message, stop, by the touchscreen controller, the initialization operation on the touchscreen if the initialization operation on the touchscreen is not completed; and when receiving the touch failure message, skip making, by the fingerprint module, any response.

As an example of this application, the processor is further configured to:

collect fingerprint information in the fingerprint recognition region when the backlight is illuminated;

perform fingerprint verification based on the fingerprint information; and control, based on a current state of the electronic device when the fingerprint verification succeeds, the electronic device to perform an operation corresponding to a fingerprint unlocking function.

As an example of this application, the processor is further configured to:

recognize a type of the touch operation; and when the type of the touch operation is a touch operation for fingerprint recognition, perform the operation of collecting fingerprint information in the fingerprint recognition region when the backlight is illuminated.

As an example of this application, the processor is further configured to:

when the fingerprint verification succeeds, if the electronic device is currently in a screen to-be-unlocked state, unlock a screen of the electronic device;

when the fingerprint verification succeeds, if the electronic device is currently in a resource to-be-paid state, perform a resource payment operation;

when the fingerprint verification succeeds, if the electronic device is currently in an account to-be-logged-in state, perform an account login operation; or when the fingerprint verification succeeds, if the electronic device is currently in an application lock to-be-unlocked state, unlock an application lock of a target application to display an application interface of the target application, where the target application is any application installed on the electronic device, the target application is set with the application lock and is currently in a to-be-started state, and the application lock is used to encrypt startup of the target application.

As an example of this application, the processor is further configured to:

detect a quantity of touch sensors touched by the touch operation in the fingerprint recognition region; and when the quantity of touch sensors is greater than or equal to a quantity threshold, determine that the touch area of the touch operation is greater than or equal to the area threshold.

According to a third aspect, a computer-readable storage medium is provided, where the computer-readable storage medium stores instructions, and when the instructions are run on a computer, the computer is enabled to perform the fingerprint unlocking method according to the first aspect.

According to a fourth aspect, a chip is provided, where the chip includes a processor, and the processor is configured to invoke a computer program in a memory to perform the fingerprint unlocking method according to the first aspect.

According to a fifth aspect, a computer program product including instructions is provided, where when the computer program product runs on a computer, the computer is enabled to perform the fingerprint unlocking method according to the first aspect.

Technical effects achieved in the second aspect, the third aspect, the fourth aspect, and the fifth aspect are similar to the technical effects achieved by corresponding technical means in the first aspect. Details are not described herein again.

REFERENCE NUMERALS

1: fingerprint recognition region; 2: lock screen interface; 3: mobile phone home screen; 4: payment verification interface; 5: payment complete interface; 6: fingerprint login interface; 7: application interface of a video application; 8: application unlock interface; 9: application interface of a social application; 11: TP touch module; 12: fingerprint module; 13: LCD controller; 14: display module; 15: unlocking module; 16: payment module; 17: login module; and 18: application lock module.

DETAILED DESCRIPTION OF ILLUSTRATIVE EMBODIMENTS

To make the objectives, technical solutions, and advantages of this application clearer, the following further describes implementations of this application in detail with reference to the accompanying drawings.

It should be understood that "a plurality of" mentioned in this application means two or more. In the descriptions of this application, unless otherwise stated, "/" means "or". For example, A/B may indicate A or B. The term "and/or" in this specification is merely an association relationship for describing associated objects, and indicates that three relationships may exist. For example, A and/or B may indicate the following three cases: Only A exists, both A and B exist, and only B exists. In addition, to clearly describe the technical solutions of this application, words such as "first" and "second" are used to distinguish between same items or similar items with basically the same functions and effects. A person skilled in the art may understand that the words such as "first" and "second" do not limit a quantity and an execution sequence, and the words such as "first" and "second" do not indicate a definite difference.

Referring to "one embodiment", "some embodiments", or the like that is described in this specification of this application means that specific features, structures, or characteristics described with reference to one or more embodiments are included in the one or more embodiments of this application. Therefore, statements such as "in one embodiment", "in some embodiments", "in some other embodiments" that appear in different parts of this specification do not necessarily refer to same embodiments, but mean "one or more but not all embodiments", unless otherwise specifically emphasized in other manners. The terms "include", "comprise", and "have", and variants thereof all mean "include but are not limited to", unless otherwise specially emphasized in other manners.

Figure 1:
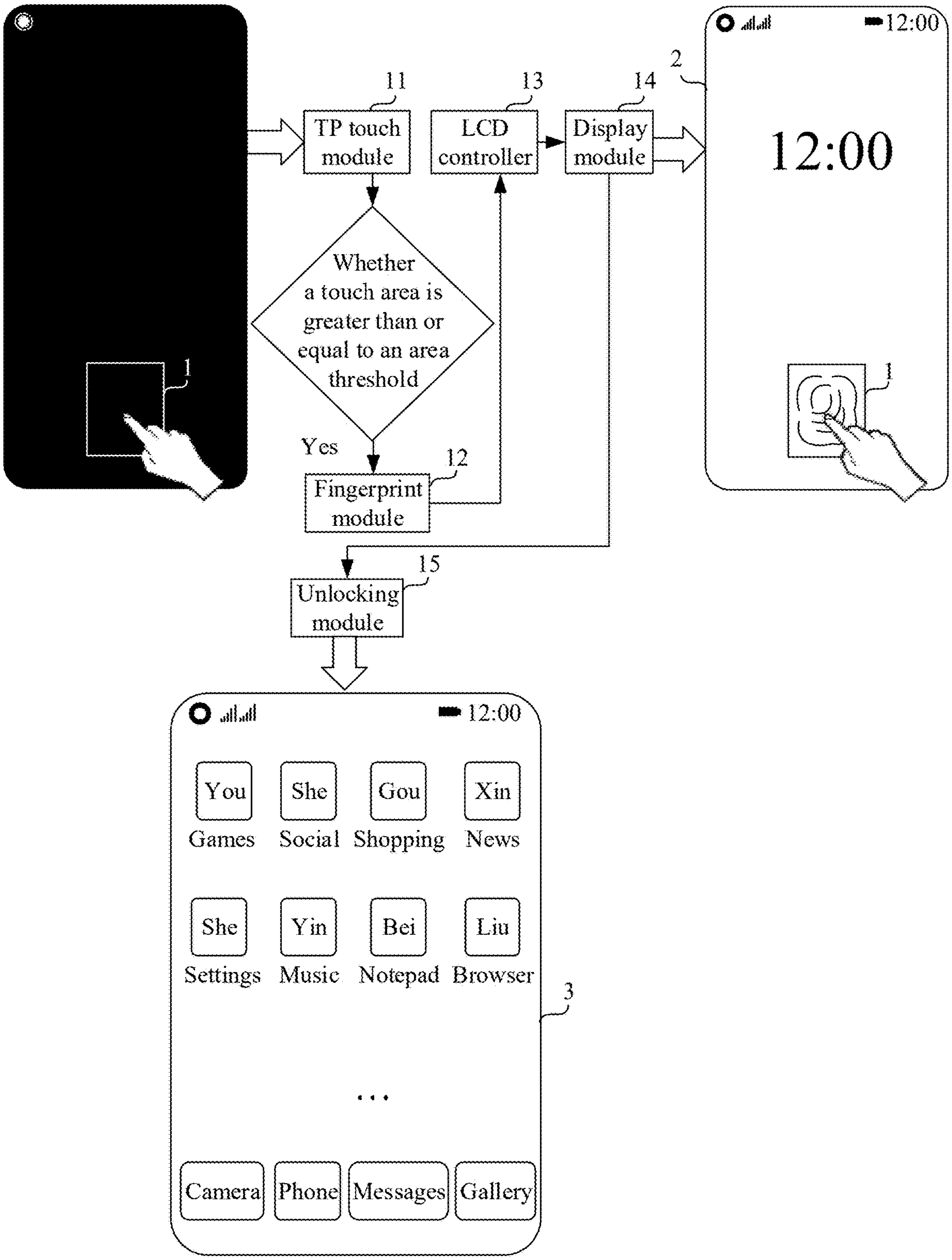
FIG. 1 is a schematic diagram of an application scenario according to an embodiment of this application.

With development of terminal technologies, to better protect user privacy and security of an electronic device, a user generally sets fingerprint unlocking for the electronic device in a process of using the electronic device. For example, the user may set fingerprint unlocking for a mobile phone in a process of using the mobile phone. Referring to FIG. 1, when the user needs to unlock the mobile phone in a screen-off state of the mobile phone, the user may touch a fingerprint recognition region 1. In response to a touch operation of a finger on the fingerprint recognition region 1, a touchpad (TouchPad, TP) touch module 11 in the mobile phone determines whether a touch area of the touch operation is greater than an area threshold, and sends a fingerprint collection message to a fingerprint module when the touch area is greater than the area threshold. When receiving the fingerprint collection message, the fingerprint module 12 collects fingerprint information, recognizes the collected fingerprint information, and sends an LCD interrupt instruction to an LCD controller 13 after fingerprint verification succeeds. When receiving the LCD interrupt instruction, the LCD controller 13 initializes an LCD screen, and sends an initialization complete message to a display module 14 after initialization is completed. When receiving the initialization complete message, the display module 14 illuminates the LCD screen, and sends an illumination message of the LCD screen to an unlocking module 15. After the LCD screen is illuminated, a lock screen interface 2 is displayed, and the fingerprint recognition region is displayed in the lock screen interface 2. When receiving the illumination message, the unlocking module 15 unlocks the screen of the mobile phone, and displays an open screen interface. The open screen interface is an interface displayed before previous screen locking. For example, a mobile phone home screen 3 is displayed.

However, if a fingerprint recognition operation is performed after a contact area between the finger and the fingerprint recognition region is greater than or equal to the area threshold, and the LCD interrupt instruction can be sent to the LCD controller only when the fingerprint verification succeeds, an initialization operation can be performed on the LCD screen only after the LCD controller receives the interrupt instruction. As a result, initialization time of the LCD screen is long, and final fingerprint unlocking efficiency is low.

To shorten fingerprint unlocking time, so as to improve fingerprint unlocking efficiency, the embodiments of this application provide a fingerprint unlocking method. In the method, when detecting a touch operation by using a TP touch module, an electronic device can directly report an LCD interrupt instruction to an LCD controller, so that the LCD controller first performs an initialization operation on an LCD screen. At the same time, the electronic device may detect, by using the TP touch module, whether a touch area of the touch operation is greater than or equal to an area threshold, and perform a fingerprint recognition operation by using a fingerprint module when the touch area is greater than or equal to the area threshold and after the initialization operation on the LCD screen is completed. The area threshold is a preset threshold. When the touch area is greater than or equal to the area threshold, it indicates that the touch operation is a valid operation, and is not an accidental touch operation performed by a user on a fingerprint recognition region. Therefore, after the touch area is greater than or equal to the area threshold, the fingerprint recognition operation may be performed by using the fingerprint module. Because the initialization operation on the LCD screen and the operation of detecting the touch area are performed at the same time, fingerprint unlocking duration is shortened, and fingerprint unlocking efficiency is improved. For specific implementation thereof, refer to the following description.

Before the fingerprint unlocking method provided in the embodiments of this application is described in detail, the electronic device in the embodiments of this application is first described.

The method provided in the embodiments of this application may be performed by an electronic device, and the electronic device supports a fingerprint unlocking function. Further, applications such as Video, Navigation, eBook, Music, Shopping, and Games may be installed on the electronic device. These applications can support a function of performing resource payment through fingerprint unlocking, and/or support a function of performing account login through fingerprint unlocking, and/or support a function of starting an application through fingerprint unlocking. As an example rather than a limitation, the electronic device may be, but is not limited to, a mobile phone action camera (GoPro), a digital camera, a tablet computer, a desktop computer, a laptop computer, a handheld computer, a notebook computer, an on-board device, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, a mobile phone, a door lock, or a smart appliance. This is not limited in the embodiments of this application.

Figure 2:
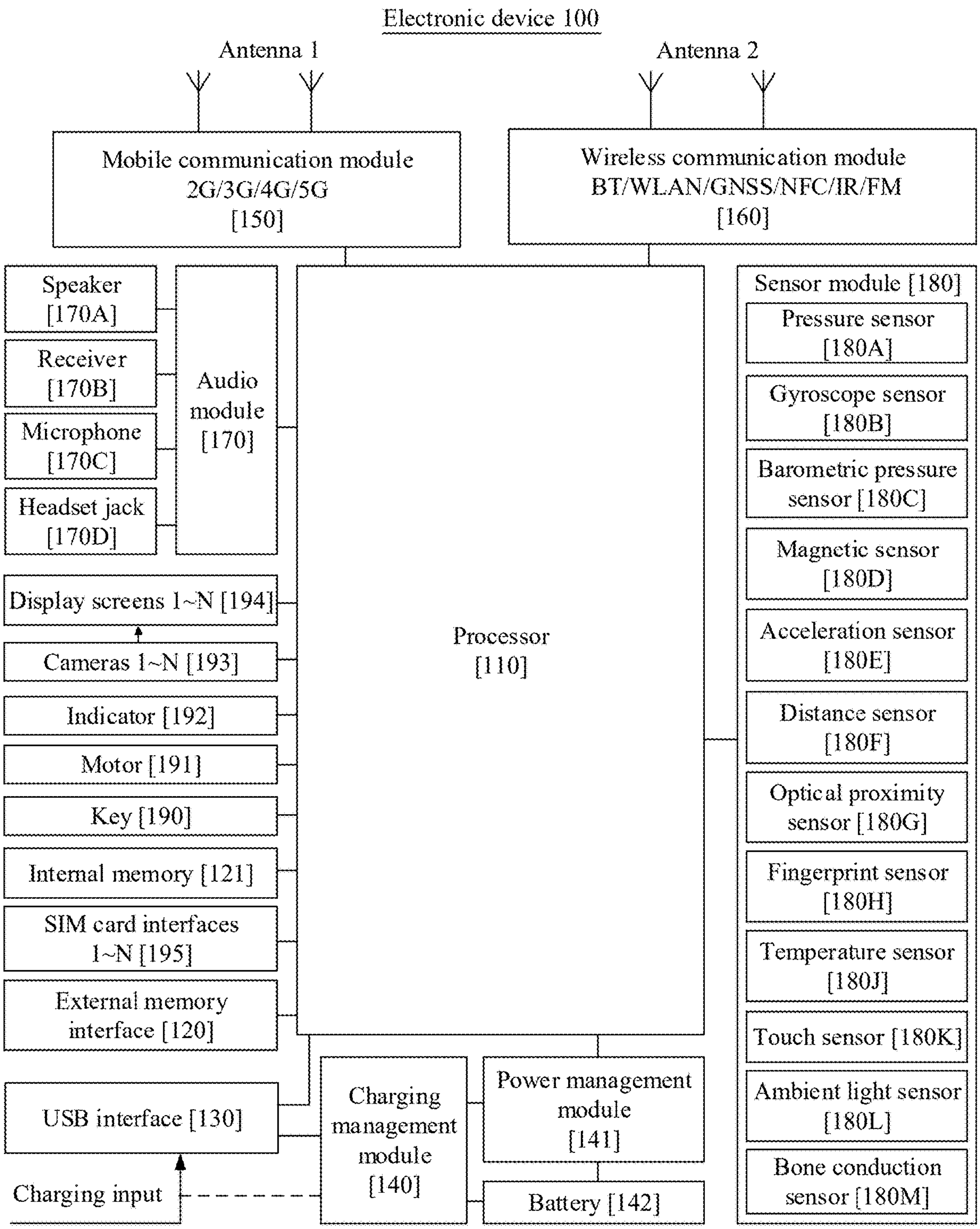
FIG. 2 is a schematic diagram of a structure of an electronic device according to an embodiment of this application.

FIG. 2 is a schematic diagram of a structure of an electronic device according to an embodiment of this application. Referring to FIG. 2, an electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on instruction operation code and a timing signal, to complete control of instruction fetching and instruction execution.

A memory may be further disposed in the processor 110 to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving efficiency of a system.

In some embodiments, the processor 110 may include one or more interfaces, for example, may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that, an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or a combination of a plurality of interface connection manners.

The electronic device 100 implements a display function by using the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N display screens 194, where N is an integer greater than 1.

The internal memory 121 may be configured to store computer-executable program code. The computer-executable program code includes instructions. The processor 110 runs the instructions stored in the internal memory 121, to perform various function applications and data processing of the electronic device 100. The internal memory 121 may include a program storage region and a data storage region. The program storage region may store an operating system, an application required by at least one function (for example, a sound playing function or an image playing function), and the like. The data storage region may store data (such as audio data and a phone book) and the like created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS).

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may also calculate a touch position based on a detection signal of the pressure sensor 180A. In some embodiments, touch operations performed at a same touch position but having different touch operation strength may correspond to different operation instructions. For example, when a touch operation whose touch operation strength is less than a pressure threshold is performed on a Messages application icon, an instruction for viewing an SMS message is executed. When a touch operation whose touch operation strength is greater than or equal to a pressure threshold is performed on a Messages application icon, an instruction for creating a new SMS message is executed.

The fingerprint sensor 180H is configured to collect a fingerprint. The electronic device 100 may implement fingerprint unlocking, application lock accessing, fingerprint-based photographing, fingerprint-based call answering, and the like by using a feature of the collected fingerprint.

The touch sensor 180K is also referred to as a "touch panel". The touch sensor 180K may be disposed in the display screen 194. The touch sensor 180K and the display screen 194 form a touchscreen, also referred to as a "touch control screen". The touch sensor 180K is configured to detect a touch operation performed on or near the touch sensor 180K. The touch sensor 180K may transfer the detected touch operation to the application processor to determine a type of the touch event. A visual output related to the touch operation may be provided by using the display screen 194. In some other embodiments, the touch sensor 180K may alternatively be disposed on a surface of the electronic device 100, at a position different from that of the display screen 194.

The key 190 includes a power-on key, a volume key, and the like. The key 190 may be a mechanical key, or may be a touch key. The electronic device 100 may receive a key input and generate a key signal input related to user settings and function control of the electronic device 100.

Next, a software system of the electronic device 100 is described.

The software system of the electronic device 100 may use a layered architecture, an event-driven architecture, a micro-kernel architecture, a microservice architecture, or a cloud architecture. In this embodiment of this application, an Android (Android) system with a layered architecture is used as an example to describe the software system of the electronic device 100.

Figure 3:
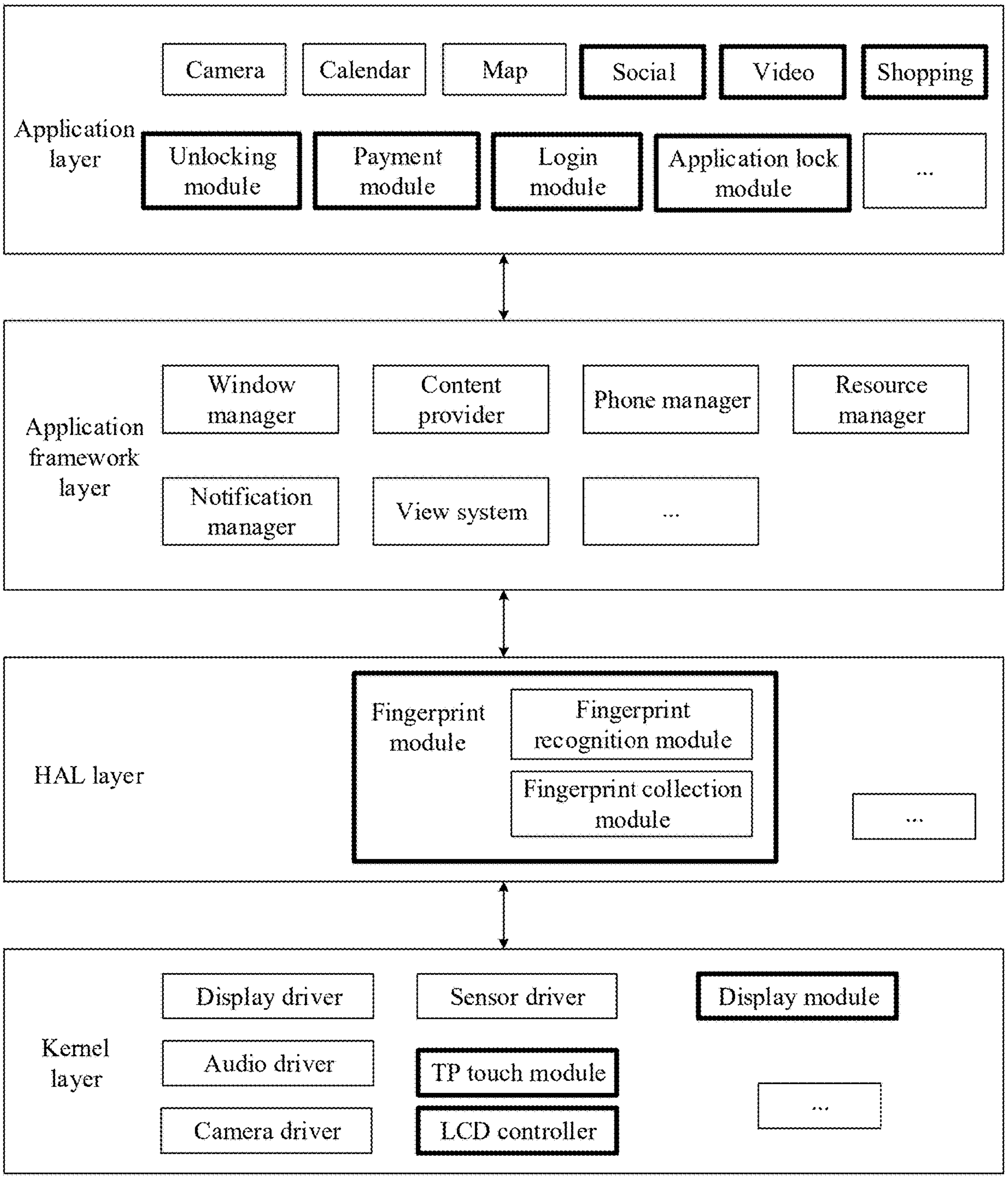
FIG. 3 is a schematic diagram of a software framework of an electronic device according to an example embodiment.

FIG. 3 is a block diagram of a software system of the electronic device 100 according to an embodiment of this application. Referring to FIG. 3, in the layered architecture, software is divided into several layers, and each layer has a clear role and task. The layers communicate with each other by using a software interface. In some embodiments, the Android system is divided into four layers from top to bottom: an application layer, an application framework layer, a hardware abstraction layer (hardware abstraction layer, HAL), and a kernel layer.

The application layer may include a series of application packages. As shown in FIG. 3, the application packages may include applications such as Shopping, Video, Social, Camera, Calendar, and Map.

As an example of this application, the application layer further includes an unlocking module, and the unlocking module is configured to unlock a screen of the electronic device when a fingerprint verification success message sent by the HAL layer is received.

As an example of this application, the application layer further includes a payment module, and the payment module is configured to perform a resource payment operation when a fingerprint verification success message sent by the HAL layer is received.

As an example of this application, the application layer further includes a login module, and the login module is configured to perform an account login operation when a fingerprint verification success message sent by the HAL layer is received.

As an example of this application, the application layer further includes an application lock module. The application lock module is configured to unlock an application corresponding to the application lock module when a fingerprint verification success message sent by the HAL layer is received, to display an application interface of a corresponding application. The corresponding application is an application that is set with an application lock and that needs to be started currently. Setting an application lock for an application means encrypting startup of the application, that is, when the application is started, an application interface of the application can be displayed only after the application is unlocked.

The application framework layer provides an application programming interface (application programming interface, API) and a programming framework for the application at the application layer. The application framework layer includes some predefined functions. As shown in FIG. 2, the application framework layer may include a window manager, a content provider, a view system, a phone manager, a resource manager, a notification manager, and the like. The window manager is configured to manage a window program. The window manager may obtain a size of a display screen, determine whether a status bar exists, lock a screen, take a screenshot, and the like. The content provider is configured to store and obtain data and make the data accessible to an application. The data may include a video, an image, audio, calls that are made and answered, a browsing history and bookmarks, a phone book, and the like. The view system includes visual controls such as a text display control and a picture display control. The view system may be configured to construct a display interface of an application. The display interface may include one or more views, for example, include a view for displaying an SMS message notification icon, include a view for displaying a text, and include a view for displaying a picture. The phone manager is configured to provide a communication function of the electronic device 100, such as call status management (including answering, hanging up, or the like). The resource manager provides various resources such as a localized character string, an icon, a picture, a layout file, and a video file for an application. The notification manager enables an application to display notification information in a status bar, and may be configured to convey a notification message that may automatically disappear after a short stay without requiring user interaction. For example, the notification manager is configured to provide a notification of download completion, a message reminder, and the like. The notification manager may alternatively be a notification that appears in a top status bar of the system in a form of a graph or a scroll bar text, for example, a notification of an application running in the background. The notification manager may alternatively be a notification that appears on a screen in a form of a dialog window. For example, text information is prompted in the status bar, a prompt tone is made, the electronic device vibrates, or an indicator light blinks.

As an example of this application, the HAL layer includes at least a fingerprint (fingerprint, FP) module. The fingerprint module is configured to: when receiving a touch complete message sent by the kernel layer, recognize, based on touch data carried in the touch complete message, whether a touch operation is a touch operation for fingerprint recognition, and send the touch complete message to the kernel layer at the same time, so that the kernel layer illuminates a backlight based on the touch complete message. Recognizing a type of the touch operation may be recognizing whether the touch operation is a touch operation for fingerprint recognition. In addition, when the fingerprint module recognizes that the touch operation is a touch operation for fingerprint recognition, and receives a backlight illumination message sent by the kernel layer, the fingerprint module may collect fingerprint information, and recognize the collected fingerprint information. The backlight illumination message is sent by the kernel layer when the kernel layer illuminates the backlight after receiving the touch complete message. When determining, based on the collected fingerprint information, that fingerprint verification succeeds, the fingerprint module may send a fingerprint verification success message to a module corresponding to a current fingerprint unlocking scenario. For example, in a screen unlocking scenario, the fingerprint module may send the fingerprint verification success message to the unlocking module. In a resource payment scenario, the fingerprint module may send the fingerprint verification success message to the payment module. In an account login scenario, the fingerprint module may send the fingerprint verification success message to the login module. In a scenario in which an application is started and the application is set with an application lock, the fingerprint module sends the fingerprint verification success message to the application lock module.

It should be noted that the fingerprint module may include a fingerprint collection module, a fingerprint recognition module, and the like. The fingerprint collection module is configured to: collect fingerprint information, and send the collected fingerprint information to the fingerprint recognition module. The fingerprint recognition module is configured to: after receiving the fingerprint information sent by the fingerprint collection module, perform fingerprint recognition based on the fingerprint information, and after the fingerprint verification succeeds, send a fingerprint verification success message to a module corresponding to a current fingerprint unlocking scenario.

The kernel layer is a layer between hardware and software. The kernel layer includes at least a TP touch module, an LCD controller, a display module, a display driver, a camera driver, an audio driver, and a sensor driver.

As an example, the TP touch module is configured to: detect a touch operation performed on a screen of the electronic device, and when detecting the touch operation, trigger an LCD interrupt to send an LCD interrupt instruction to the LCD controller, and determine whether a touch area of the touch operation is greater than or equal to an area threshold. If the TP touch module detects that the touch area is greater than or equal to the area threshold, it indicates that the touch operation is not a misoperation of a user. Therefore, the TP touch module may send a touch complete message to the fingerprint module. If the TP touch module detects that the touch area is less than the area threshold, it indicates that the touch operation is a misoperation of a user. Therefore, the TP touch module may send a touch failure message to the LCD controller and/or the fingerprint module, or send no message.

As an example of this application, the TP touch module may include a touch sensor and a touch processor. The touch sensor is configured to detect a touch operation performed on a screen of the electronic device. The touch processor is configured to trigger an LCD interrupt to send an LCD interrupt instruction to the LCD controller, and at the same time, detect whether a touch area of the touch operation is greater than or equal to an area threshold.

As an example, the LCD controller is configured to: when receiving the LCD interrupt instruction, perform an initialization operation on an LCD screen, and send an initialization complete message to the display module after initialization is completed. In addition, when receiving the touch failure message, the LCD controller does not perform the initialization operation if the initialization operation on the LCD screen is not completed currently.

As an example, the display module is configured to: when receiving the initialization complete message and the touch complete message, illuminate a backlight of the electronic device screen, and send a backlight illumination message to the fingerprint module.

It should be noted that the display module may include a high brightness monitor (High Brightness Monitor, HBM).

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and recognizes a control corresponding to the original input event. For example, the touch operation is a single-tap operation, and a control corresponding to the single-tap operation is a control of a camera application icon. A camera application invokes an interface at the application framework layer to start the camera application, and then invokes the kernel layer to start the camera driver, and the camera 193 captures a still image or a video.

For ease of understanding, before the method provided in the embodiments of this application is described in detail, based on the execution body provided in the foregoing embodiment, application scenarios in the embodiments of this application are described below by using an example in which the electronic device is a mobile phone.

Figure 4:
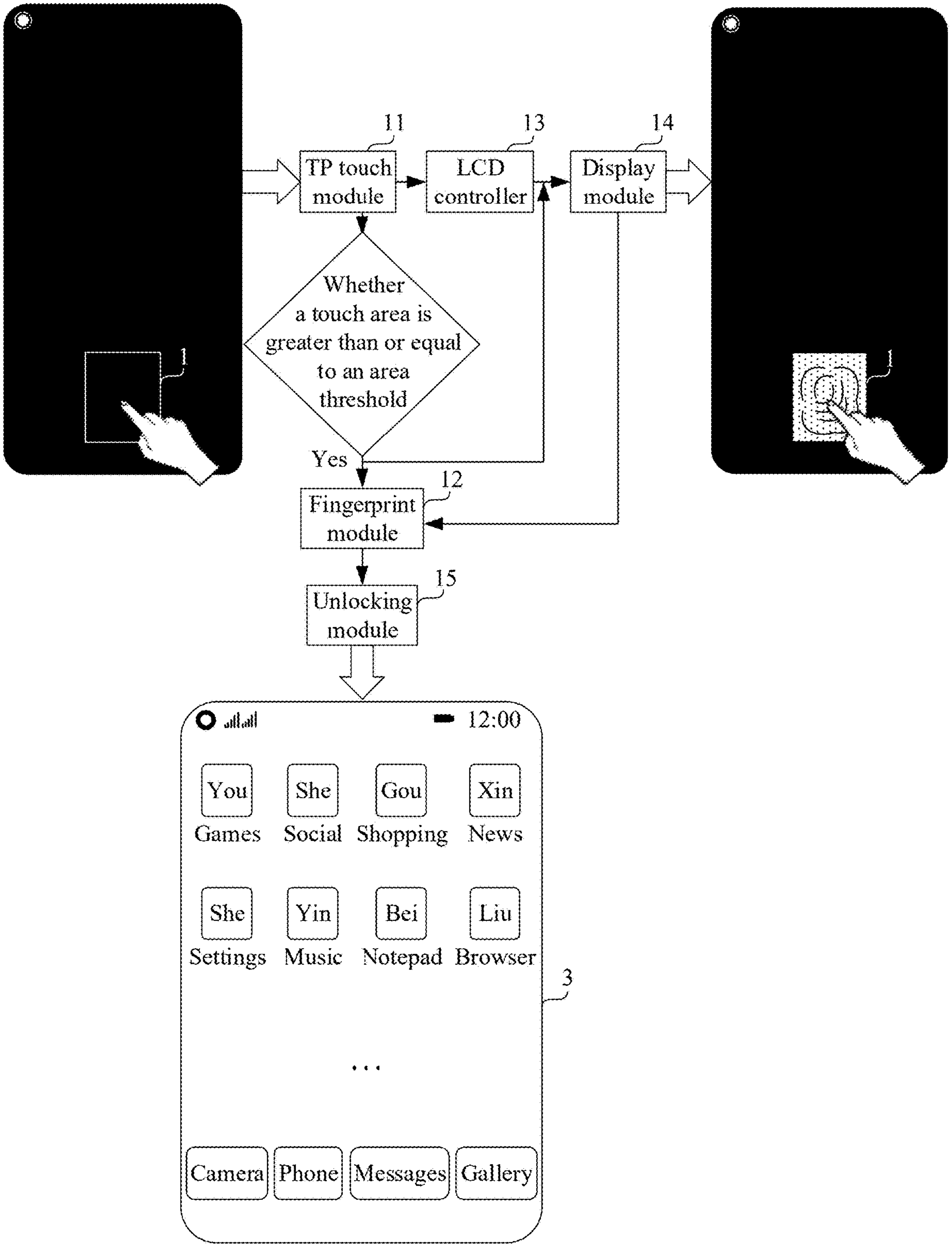
FIG. 4 is a schematic diagram of a fingerprint unlocking application scenario according to an example embodiment.

Reference is made to FIG. 4. FIG. 4 is a schematic diagram of an application scenario according to an example embodiment. In a possible scenario, to avoid leakage of privacy on a mobile phone, a user generally sets a lock screen password for the mobile phone, for example, sets a fingerprint password for the mobile phone. Referring to FIG. 4, when the mobile phone is in a screen locked state and a fingerprint password is set for the mobile phone, if the user needs to unlock the mobile phone, the user may touch a fingerprint recognition region 1 of the mobile phone. In response to a touch operation on the fingerprint recognition region 1, a TP touch module 11 in the mobile phone triggers an LCD interrupt to send an LCD interrupt instruction to an LCD controller 13. At the same time, the TP touch module 11 determines whether a touch area of the touch operation is greater than or equal to an area threshold, and sends a touch complete message to a fingerprint module 12 when the touch area is greater than or equal to the area threshold. When receiving the touch complete message, the fingerprint module 12 recognizes whether the touch operation is a touch operation for fingerprint recognition, and sends the touch complete message to a display module 14 at the same time. When receiving the LCD interrupt instruction, the LCD controller 13 performs an initialization operation on an LCD screen, and sends an initialization complete message to the display module 14 when the initialization operation is completed. When receiving the initialization complete message and the touch complete message, the display module 14 illuminates a backlight of the LCD screen, and sends a backlight illumination message to the fingerprint module 12. After recognizing that the touch operation is a touch operation for fingerprint recognition, and receiving the backlight illumination message, the fingerprint module 12 collects fingerprint information in the fingerprint recognition region, and sends a fingerprint verification success message to an unlocking module 15 when fingerprint verification succeeds. The mobile phone unlocks the LCD screen of the mobile phone by using the unlocking module 15, and displays an unlocked mobile phone interface, for example, displays a mobile phone home screen 3.

It should be noted that, when illuminating the backlight, the display module 14 may illuminate all backlights, or may illuminate backlights in some regions, for example, illuminate a backlight in a frame of the mobile phone and illuminate a backlight in the fingerprint recognition region. In the accompanying drawings of this embodiment of this application, that the backlight in the fingerprint recognition region is illuminated is used as an example for description. In addition, in the figure of this embodiment of this application, background filling is performed on the fingerprint recognition region to indicate that the backlight in the fingerprint recognition region is illuminated.

Figure 5:
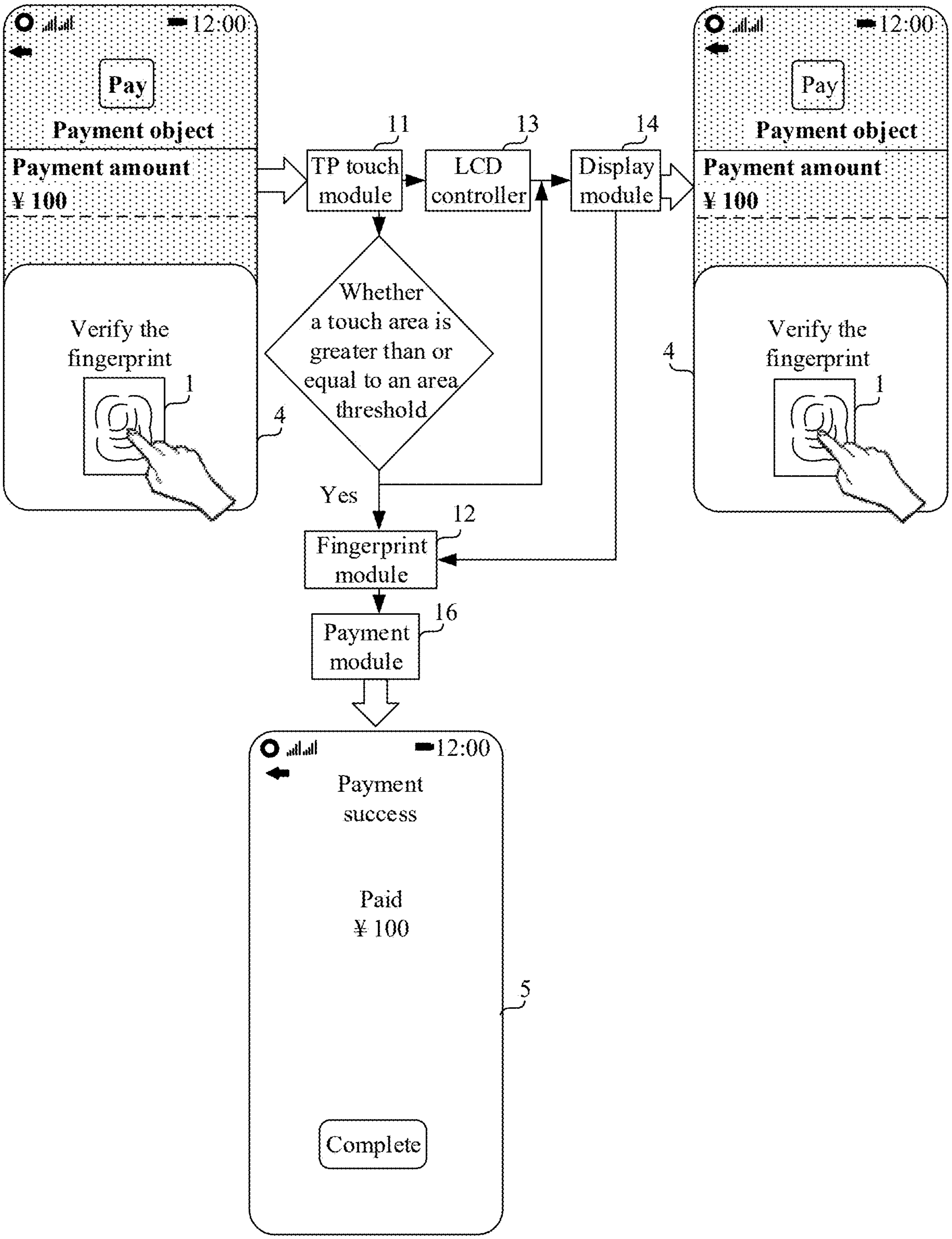
FIG. 5 is a schematic diagram of a fingerprint unlocking application scenario according to another example embodiment.

As an example of this application, in a process of using a mobile phone, a user may perform resource payment by using a payment application of the mobile phone. Before resource payment is performed, security verification generally needs to be performed for property security. For example, referring to FIG. 5, when resource payment is performed, a payment verification interface 4 may be displayed. A fingerprint recognition region 1 is displayed in the payment verification interface 4, and the user may touch the fingerprint recognition region 1. In response to a touch operation on the fingerprint recognition region 1, a TP touch module 11 in the mobile phone triggers an LCD interrupt to send an LCD interrupt instruction to an LCD controller 13. At the same time, the TP touch module 11 determines whether a touch area of the touch operation is greater than or equal to an area threshold, and sends a touch complete message to a fingerprint module 12 when the touch area is greater than or equal to the area threshold. When receiving the touch complete message, the fingerprint module 12 recognizes whether the touch operation is a touch operation for fingerprint recognition, and sends the touch complete message to a display module 14 at the same time. When receiving the LCD interrupt instruction, the LCD controller 13 performs an initialization operation on an LCD screen, and sends an initialization complete message to the display module 14 when the initialization operation is completed. When receiving the initialization complete message and the touch complete message, the display module 14 illuminates a backlight of the LCD screen, and sends a backlight illumination message to the fingerprint module 12. A fingerprint recognition operation is performed when the payment verification interface is displayed on the mobile phone, and the screen of the mobile phone is already in an illuminated state. Therefore, in response to the operation of illuminating the backlight of the LCD screen, the mobile phone may continue to display the payment verification interface. After recognizing that the touch operation is a touch operation for fingerprint recognition, and receiving the backlight illumination message, the fingerprint module 12 collects fingerprint information in the fingerprint recognition region, and sends a fingerprint verification success message to a payment module 16 when fingerprint verification succeeds. The mobile phone completes resource payment by using the payment module 16, and displays a payment complete interface 5 after payment is completed.

Figure 6:
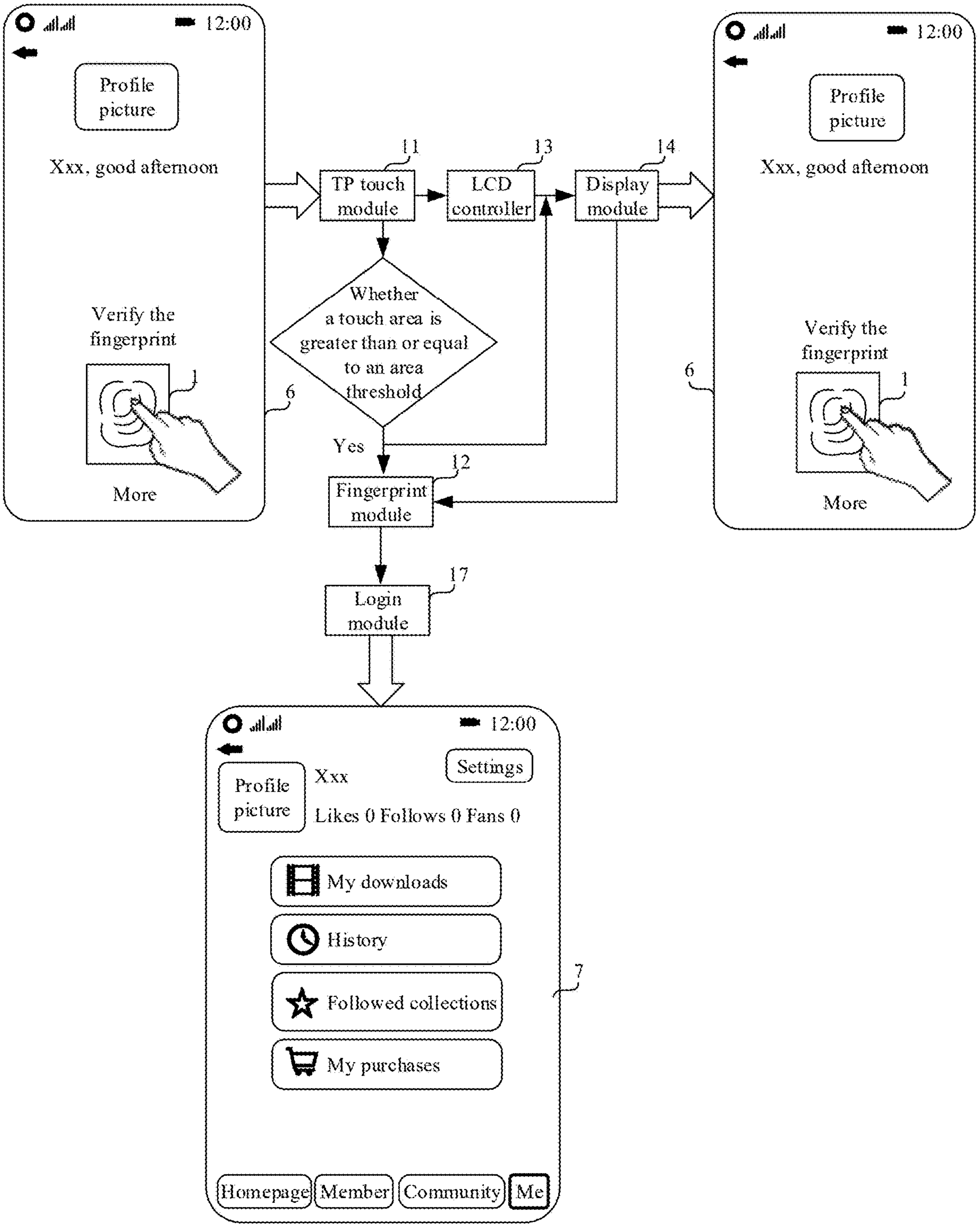
FIG. 6 is a schematic diagram of a fingerprint unlocking application scenario according to another example embodiment.

As an example of this application, in a process in which a user uses a mobile phone, some applications need to be used after account login, and some applications implement more functions after account login, for example, a video application, a bank application, and a payment application. However, when account login is performed by entering an account and a password, the account may be entered incorrectly or the password may be entered incorrectly. In this case, to reduce a login error rate, generally, account login may also be performed through fingerprint verification. Referring to FIG. 6, in a video application, when account login is performed through fingerprint verification, the user may touch a fingerprint recognition region 1 in a fingerprint login interface 6 of the video application. In response to a touch operation on the fingerprint recognition region 1, a TP touch module 11 in the mobile phone triggers an LCD interrupt to send an LCD interrupt instruction to an LCD controller 13. At the same time, the TP touch module 11 determines whether a touch area of the touch operation is greater than or equal to an area threshold, and sends a touch complete message to a fingerprint module 12 when the touch area is greater than or equal to the area threshold. When receiving the touch complete message, the fingerprint module 12 recognizes whether a type of the touch operation is a touch operation for fingerprint recognition, and sends the touch complete message to a display module 14 at the same time. When receiving the LCD interrupt instruction, the LCD controller 13 performs an initialization operation on an LCD screen, and sends an initialization complete message to the display module 14 when the initialization operation is completed. When receiving the initialization complete message and the touch complete message, the display module 14 illuminates a backlight of the LCD screen, and sends a backlight illumination message to the fingerprint module 12. A fingerprint recognition operation is performed when the fingerprint login interface is displayed on the mobile phone, and the screen of the mobile phone is already in an illuminated state. Therefore, in response to the operation of illuminating the backlight of the LCD screen, the mobile phone may continue to display the fingerprint login interface. After recognizing that the touch operation is a touch operation for fingerprint recognition, and receiving the backlight illumination message, the fingerprint module 12 collects fingerprint information in the fingerprint recognition region, and sends a fingerprint verification success message to a login module 17 when fingerprint verification succeeds. The mobile phone completes account login by using the login module 17, and displays an application interface 7 of the video application.

Figure 7:
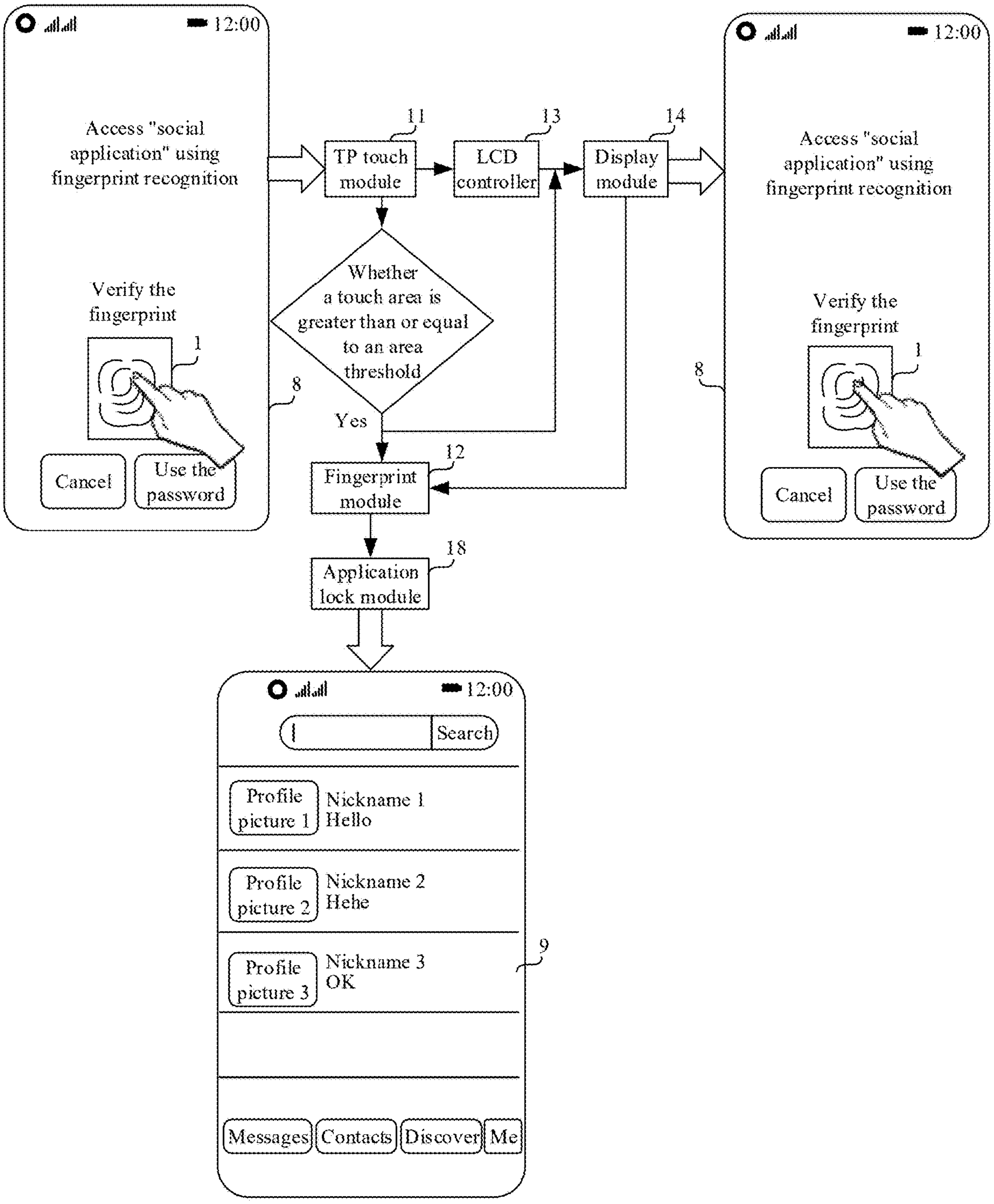
FIG. 7 is a schematic diagram of a fingerprint unlocking application scenario according to another example embodiment.

As an example of this application, in a process of using a mobile phone, a user may set an application lock for some applications, for example, set an application lock for a social application, and the user taps an application icon of the social application. In response to a tap operation on the application icon of the social application, referring to FIG. 7, the mobile phone displays an application unlock interface 8. The user may touch a fingerprint recognition region 1 displayed in the application unlock interface 8. In response to a touch operation on the fingerprint recognition region 1, a TP touch module 11 in the mobile phone triggers an LCD interrupt to send an LCD interrupt instruction to an LCD controller 13. At the same time, the TP touch module 11 determines whether a touch area of the touch operation is greater than or equal to an area threshold, and sends a touch complete message to a fingerprint module 12 when the touch area is greater than or equal to the area threshold. When receiving the touch complete message, the fingerprint module 12 recognizes whether the touch operation is a touch operation for fingerprint recognition, and sends the touch complete message to a display module 14 at the same time. When receiving the LCD interrupt instruction, the LCD controller 13 performs an initialization operation on an LCD screen, and sends an initialization complete message to the display module 14 when the initialization operation is completed. When receiving the initialization complete message and the touch complete message, the display module 14 illuminates a backlight of the LCD screen, and sends a backlight illumination message to the fingerprint module 12. A fingerprint recognition operation is performed when the application unlock interface is displayed on the mobile phone, and the screen of the mobile phone is already in an illuminated state. Therefore, in response to the operation of illuminating the backlight of the LCD screen, the mobile phone may still display the application unlock interface. After recognizing that the touch operation is a touch operation for fingerprint recognition, and receiving the backlight illumination message, the fingerprint module 12 collects fingerprint information in the fingerprint recognition region, and sends a fingerprint verification success message to an application lock module 18 when fingerprint verification succeeds. The mobile phone no longer displays the application unlock interface 8 by using the application lock module 18, that is, the mobile phone unlocks, by using the application lock module, the application lock that is set for the social application, and then displays an application interface 9 of the social application.

It should be noted that the foregoing application scenarios shown in FIG. 4-FIG. 7 are used as an example for description in the embodiments of this application. Another scenario in which fingerprint unlocking needs to be performed may also be applicable to the manner described in the embodiments of this application.

Figure 8:
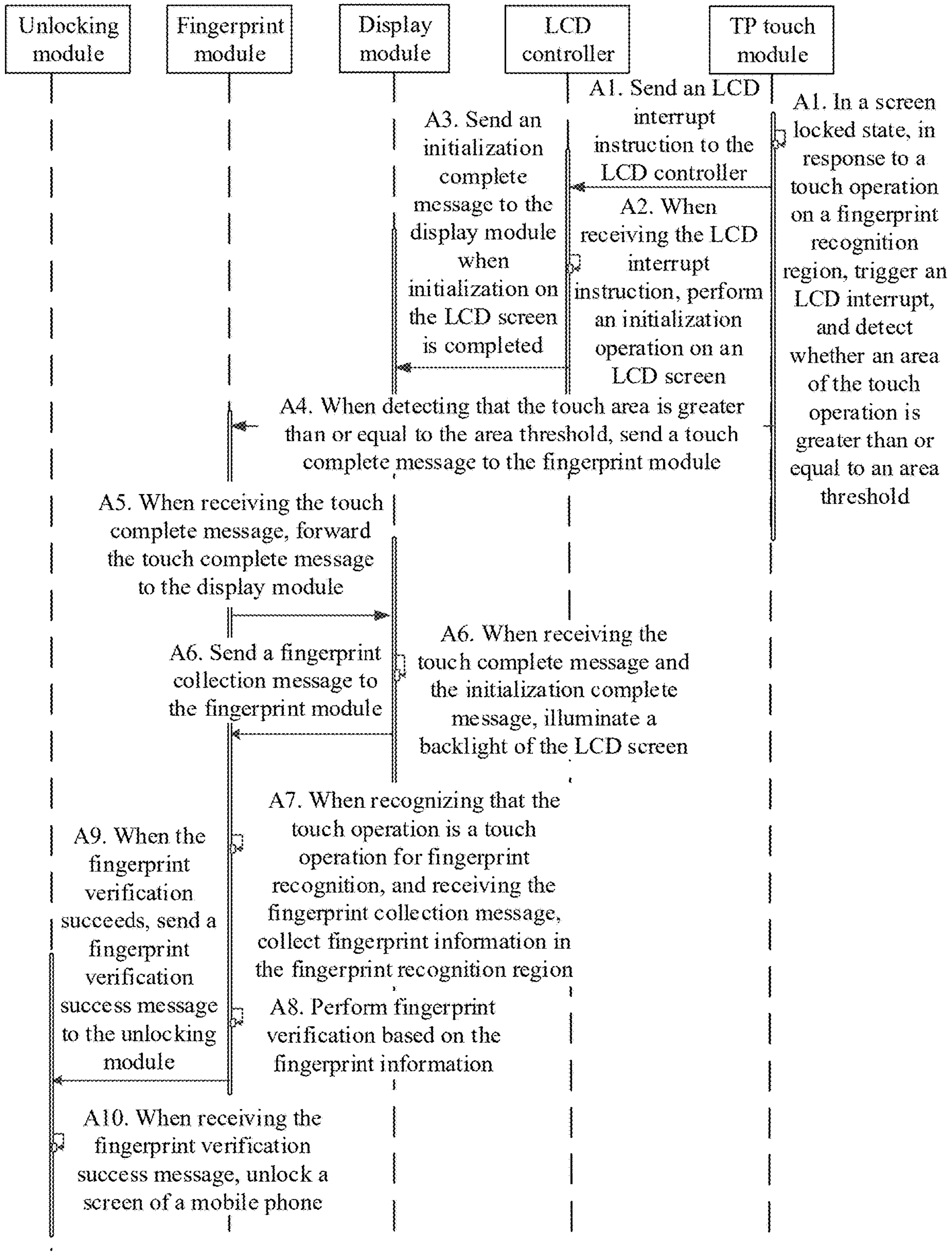
FIG. 8 is a schematic flowchart of a fingerprint unlocking method according to an example embodiment.

Based on the execution body and the application scenarios provided in the foregoing embodiments, the fingerprint unlocking method provided in the embodiments of this application is described below. Reference is made to FIG. 8. FIG. 8 is a schematic flowchart of a fingerprint unlocking method according to an example embodiment. In addition, unlocking a screen of a mobile phone is used as an example in FIG. 8 for description. As an example rather than a limitation, an example in which the method is applied to a mobile phone configured with a fingerprint unlocking function and the mobile phone is implemented through interaction between a plurality of modules shown in FIG. 3 is used for description herein. The method may include some or all of the following content:

Step A1: In a screen locked state, in response to a touch operation on a fingerprint recognition region, a TP touch module triggers an LCD interrupt to send an LCD interrupt instruction to an LCD controller, and detects whether a touch area of the touch operation is greater than or equal to an area threshold.

When a user needs to use the mobile phone, if the mobile phone is in a screen locked state, the user needs to unlock the mobile phone first. If the mobile phone supports fingerprint unlocking, and a function that unlocking can be performed by using a fingerprint is preset on the mobile phone, the user touches the fingerprint recognition region of the mobile phone. In response to the touch operation on the fingerprint recognition region, the TP touch module may directly trigger the LCD interrupt to send the LCD interrupt instruction to the LCD controller, and detect whether the touch area of the touch operation is greater than or equal to the area threshold.

It should be noted that the touch area of the touch operation is a contact area between a finger and a screen of the mobile phone when the finger of the user acts on the fingerprint recognition region.

It may be learned from the foregoing description that the TP touch module may include a touch sensor and a touch processor. Therefore, as an example, the TP touch module may detect the touch operation of the user by using the touch sensor, and when detecting the touch operation of the user, trigger the LCD interrupt by using the touch processor, to send the LCD interrupt instruction to the LCD controller, and detect whether the touch area of the touch operation is greater than or equal to the area threshold.

It should be noted that the area threshold is a threshold that is preset based on a requirement, and a minimum value of the set area threshold is an area required for implementing a fingerprint recognition function.

In some embodiments, the operation of detecting, by the TP touch module, whether a touch area of the touch operation is greater than or equal to an area threshold includes: detecting a quantity of touch sensors touched by the touch operation in the fingerprint recognition region; and when the quantity of touch sensors is greater than or equal to a quantity threshold, determining that the touch area of the touch operation is greater than or equal to the area threshold.

It should be noted that the operation of detecting, by the TP touch module, whether a touch area of the touch operation is greater than or equal to an area threshold may include not only the foregoing manner, but also another manner. For another manner, refer to the related technology. Details are not described one by one in this embodiment of this application.

Step A2: When receiving the LCD interrupt instruction, the LCD controller performs an initialization operation on an LCD screen.

It should be noted that, when detecting the touch operation, the TP touch module may send the LCD interrupt instruction to the LCD controller. In this way, in a process in which the TP touch module detects whether the touch area is greater than or equal to the area threshold, the LCD controller can perform the initialization operation on the LCD screen at the same time, thereby shortening time of waiting for the initialization operation on the LCD screen, and increasing a fingerprint unlocking speed.

It should be noted that, for the operation of initializing the LCD screen by the LCD controller, refer to the related technology. For example, the initialization operation performed by the LCD controller on the LCD screen includes: clearing the LCD screen (DISPLAY CLEAR), setting a function of the LCD screen (FUNCTION SET), a display on/off control manner (DISPLAY ON/OFF CONTROL), and setting an entry manner of the LCD screen (ENTRY MODE SET). Details are not described one by one in this embodiment of this application.

Step A3: The LCD controller sends an initialization complete message to a display module when initialization on the LCD screen is completed.

In a fingerprint unlocking process, a backlight generally needs to be illuminated, and the backlight can be illuminated only after initialization on the LCD screen is completed. Therefore, after initialization on the LCD screen is completed, the LCD controller may send the initialization complete message to the display module.

Step A4: When detecting that the touch area is greater than or equal to the area threshold, the TP touch module sends a touch complete message to a fingerprint module.

A premise of fingerprint recognition is that a touch area of a finger in the fingerprint recognition region meets a requirement, and a minimum value of the area threshold is an area required for implementing a fingerprint recognition function. Therefore, when the touch area is greater than or equal to the area threshold, the touch complete message may be sent to the fingerprint module.

In some embodiments, when the TP touch module detects that the touch area is less than the area threshold, it indicates that the user may accidentally touch the fingerprint recognition region, and is not intended to unlock the mobile phone. Therefore, the TP touch module may send a touch failure message to the LCD controller. When receiving the touch failure message, the LCD controller does not perform the initialization operation if the initialization operation on the LCD screen is not completed currently. In addition, the TP touch module does not send any message to the fingerprint module.

In some embodiments, when the TP touch module detects that the touch area is less than the area threshold, the TP touch module may alternatively send a touch failure message to both the LCD controller and the fingerprint module. If the initialization operation on the LCD screen is not completed currently, the initialization operation is not performed. In addition, when receiving the touch failure message, the fingerprint module does not perform any operation.

In some embodiments, when detecting that the touch area is less than the area threshold, the TP touch module does not send a touch failure message to any module.

Step A5: When receiving the touch complete message, the fingerprint module forwards the touch complete message to the display module.

When the touch area is greater than or equal to the area threshold, it indicates that the current touch operation is not a misoperation performed by the user on the screen of the mobile phone, but requires fingerprint unlocking. In the fingerprint unlocking process, to prompt the user that the current touch operation is valid, the backlight may be further illuminated in the fingerprint unlocking process. Therefore, when receiving the touch complete message, the fingerprint module may forward the touch complete message to the display module.

In some embodiments, when receiving the touch complete message, the fingerprint module may not only forward the touch complete message to the display module, but also recognize, based on touch data carried in the touch complete message, whether the touch operation is a touch operation for fingerprint recognition.

In a fingerprint recognition process, the finger of the user is required to act in the fingerprint recognition region for specific duration. Otherwise, fingerprint recognition cannot be performed. Therefore, the touch data may include touch duration in which the touch operation is performed on the fingerprint recognition region.

It should be noted that, for a manner in which the fingerprint module recognizes a type of the touch operation based on the touch data, refer to the related technology. For example, when the touch data includes the touch duration, if it is detected that the touch duration is greater than or equal to a duration threshold, it is determined that the touch operation is a touch operation for fingerprint recognition. Alternatively, the touch data may include a capacitance value on the screen after the touch operation, a pressure value generated by the touch operation on the screen, an acceleration value generated by the touch operation on the mobile phone, and the like. If the fingerprint module detects that the capacitance value falls within a preset capacitance range, the pressure value falls within a preset pressure range, and the acceleration value falls within a preset acceleration range, the fingerprint module determines that the touch operation is a touch operation for fingerprint recognition. The preset capacitance range, the preset pressure range, and the preset acceleration range are all obtained in advance based on a machine learning algorithm. For example, a plurality of touch tests may be performed on the screen of the mobile phone in advance. Each time the screen is touched by using a finger joint, a fingernail, a finger pulp, a touch capacitive stylus, and the like, and touch data corresponding to each touch is recorded. Then, touch data generated when a touch operation is performed by using the finger pulp and touch data generated when a touch operation is performed by using a non-finger pulp are counted and distinguished from each other, so that a range corresponding to touch data generated by each type of touch operation is determined. Details are not described one by one in this embodiment of this application.

It should be further noted that, when the LCD controller completes initialization on the LCD screen, the TP touch module may already send the touch complete message to the fingerprint module. Alternatively, when the TP touch module detects that the touch area is greater than or equal to the area threshold, the LCD controller already sends the initialization complete message to the display module. Alternatively, when the TP touch module detects that the touch area is greater than or equal to the area threshold, the LCD controller exactly completes the initialization operation on the LCD screen. Therefore, when the LCD controller sends the initialization complete message to the display module, the TP touch module also sends the touch complete message to the fingerprint module. Therefore, in this embodiment of this application, an execution sequence of step A3 and step A4 is not limited.

Step A6: When receiving the touch complete message and the initialization complete message, the display module illuminates a backlight of the LCD screen, and sends a fingerprint collection message to the fingerprint module.

It should be noted that the backlight that is of the LCD screen and that is illuminated by the display module may be all backlights mounted in the mobile phone, or may be a backlight in a specific region, for example, a backlight in the fingerprint recognition region and a backlight in a frame of the mobile phone may be illuminated. This is not specifically limited in this embodiment of this application.

Step A7: When recognizing that the touch operation is a touch operation for fingerprint recognition, and receiving the fingerprint collection message, the fingerprint module collects fingerprint information in the fingerprint recognition region.

It may be learned from the foregoing description that the fingerprint module includes a fingerprint collection module. Therefore, when recognizing that the touch operation is a touch operation for fingerprint recognition, and receiving the fingerprint collection message, the fingerprint module may collect the fingerprint information in the fingerprint recognition region by using the fingerprint collection module.

As an example, the fingerprint collection module may include a fingerprint sensor. Therefore, the fingerprint information in the fingerprint recognition region may be collected by using the fingerprint sensor.

Step A8: The fingerprint module performs fingerprint verification based on the fingerprint information.

It may be learned from the foregoing description that the fingerprint module includes a fingerprint recognition module. Therefore, after collecting the fingerprint information, the fingerprint collection module may send the fingerprint information to the fingerprint recognition module. After receiving the fingerprint information, the fingerprint recognition module performs fingerprint verification based on the fingerprint information.

As an example, the operation of performing fingerprint verification by the fingerprint recognition module based on the fingerprint information includes: comparing the collected fingerprint information with stored fingerprint information, and when target fingerprint information exists in the stored fingerprint information, determining that the fingerprint verification succeeds, where the target fingerprint information is fingerprint information whose similarity to the collected fingerprint information is greater than or equal to a similarity threshold.

In some embodiments, the stored fingerprint information is fingerprint information that is entered by the user in the mobile phone in advance. For example, in response to a setting operation for fingerprint unlocking, the mobile phone may display a fingerprint entry interface. The user may touch a fingerprint entry region in the fingerprint entry interface a plurality of times by using a finger pulp of a same finger, so that the mobile phone stores fingerprint information of the finger in response to a plurality of touch operations on the fingerprint entry region. Certainly, the user may repeat the foregoing operation, so that the mobile phone stores fingerprint information of different fingers.

It should be noted that the similarity threshold may be preset based on a requirement. For example, the similarity threshold may be 99%, 96%, or 90%.

Step A9: When the fingerprint verification succeeds, the fingerprint module sends a fingerprint verification success message to an unlocking module.

Because the unlocking module can unlock the mobile phone, when the fingerprint verification succeeds, the fingerprint module sends the fingerprint verification success message to the unlocking module.

Step A10: When receiving the fingerprint verification success message, the unlocking module unlocks the screen of the mobile phone.

It should be noted that, for the operation of unlocking the screen of the mobile phone by the unlocking module, refer to the related technology. For example, the unlocking module may create a wakelock (WakeLock) corresponding to the screen, and activate the wakelock, to unlock the screen of the mobile phone. Details are not described one by one in this embodiment of this application.

In some embodiments, after the mobile phone is successfully unlocked, the user may implement various functions by using the mobile phone. Different touch operations may trigger different functions. To avoid function confusion, after the unlocking module unlocks the screen of the mobile phone, the mobile phone does not display the fingerprint recognition region.

In some embodiments, after the mobile phone is successfully unlocked, the unlocking module may further send an unlocking success message to the display module. When receiving the unlocking success message, the display module illuminates the screen of the mobile phone.

It should be noted that, for the operation of illuminating the screen of the mobile phone by the display module, refer to the related technology. Details are not described one by one in this embodiment of this application.

In this embodiment of this application, in the fingerprint unlocking process, the LCD interrupt instruction may be directly sent to the LCD controller when the touch operation is detected, so that the initialization operation on the LCD screen and the operation of detecting the touch area are performed at the same time, thereby shortening fingerprint unlocking duration, and improving fingerprint unlocking efficiency.

Figure 9A:
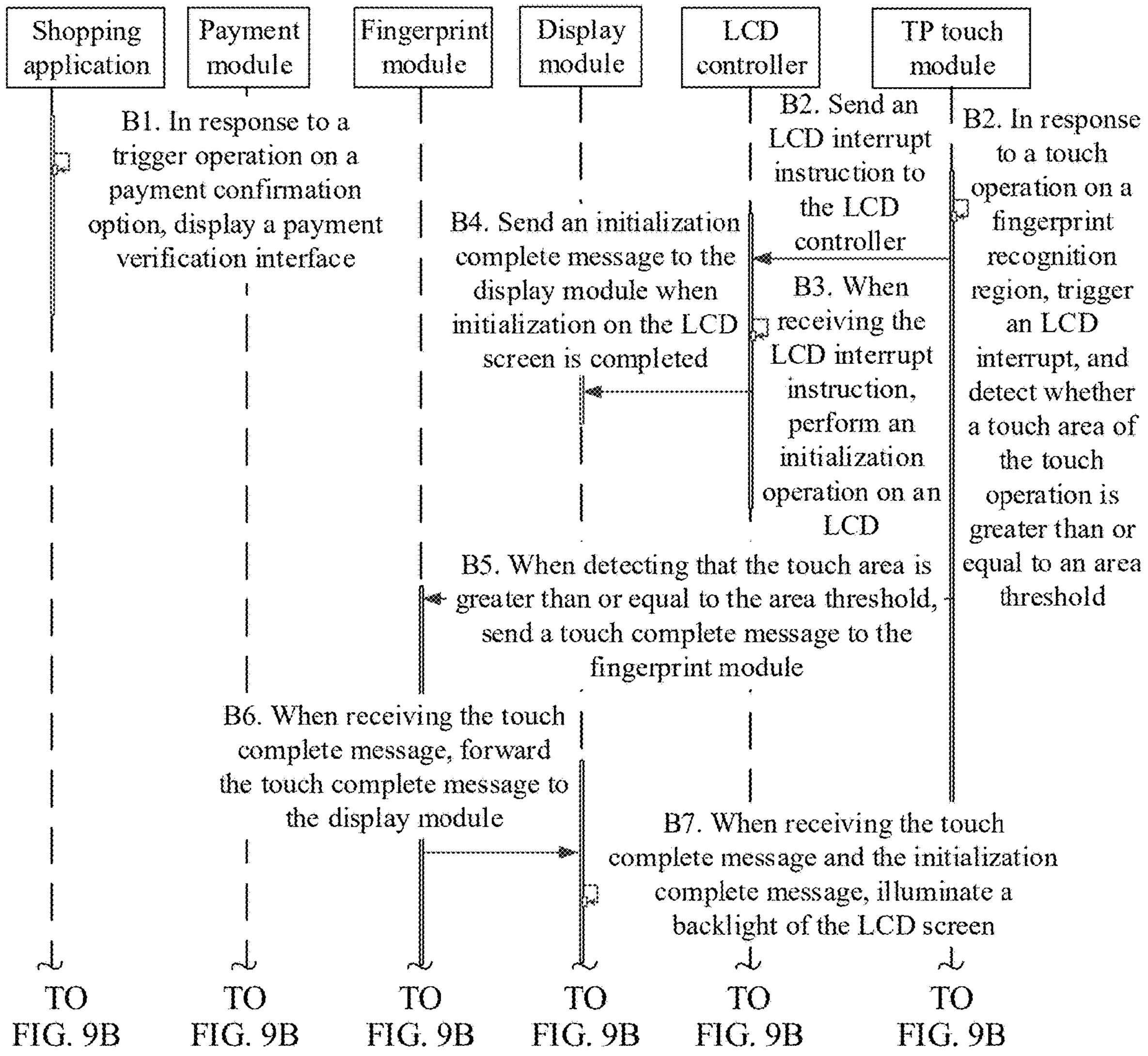
FIG. 9A and FIG. 9B are a schematic flowchart of a fingerprint unlocking method according to another example embodiment.
Figure 9B:
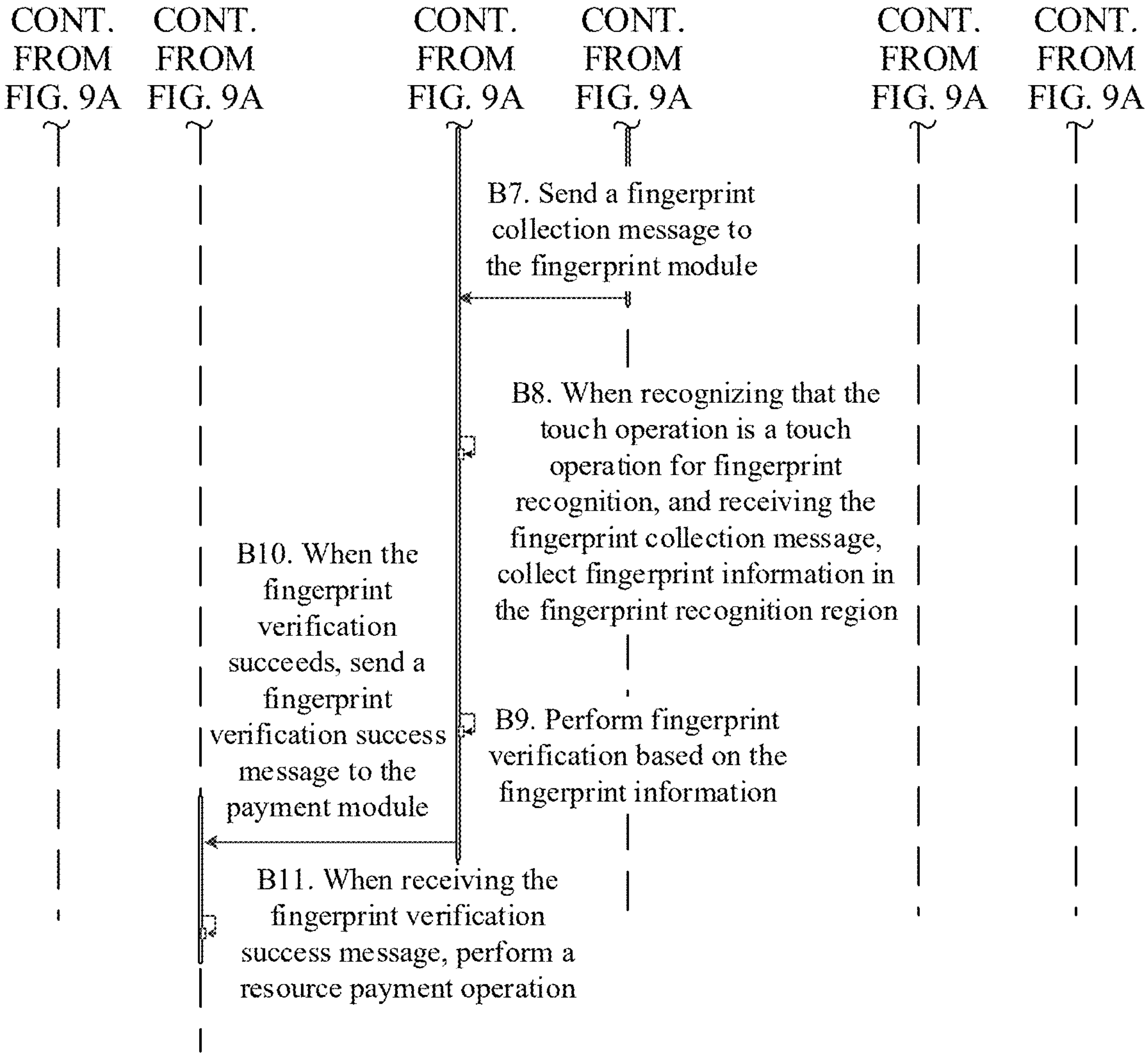

Reference is made to FIG. 9A and FIG. 9B. FIG. 9A and FIG. 9B are a schematic flowchart of a fingerprint unlocking method according to another example embodiment. In addition, in FIG. 9A and FIG. 9B, an example in which resource payment is performed through fingerprint recognition is used for description. As an example rather than a limitation, an example in which the method is applied to a mobile phone configured with a fingerprint unlocking function and the mobile phone is implemented through interaction between a plurality of modules shown in FIG. 3 is used for description herein. The method may include some or all of the following content:

Step B1: In response to a trigger operation on a payment confirmation option, a shopping application displays a payment verification interface.

Sometimes, for payment security, a user may set fingerprint unlocking in a resource payment process, that is, ensure payment security by verifying fingerprint information. Therefore, in response to the trigger operation on the payment confirmation option, the shopping application may display the payment verification interface, and a fingerprint recognition region is displayed in the payment verification interface.

It should be noted that in this embodiment of this application, the shopping application is only used as an example for description, and another application that has a payment function is also applicable to the operation provided in this embodiment of this application. Details are not described one by one in this embodiment of this application.

Step B2: In response to a touch operation on a fingerprint recognition region in the payment verification interface, a TP touch module triggers an LCD interrupt to send an LCD interrupt instruction to an LCD controller, and detects whether a touch area of the touch operation is greater than or equal to an area threshold.

Step B3: When receiving the LCD interrupt instruction, the LCD controller performs an initialization operation on an LCD screen.

It should be noted that a fingerprint recognition operation is performed when the payment verification interface is displayed, that is, the fingerprint recognition operation is performed when a display screen is illuminated. In this case, the LCD screen is already in an initialization complete state. Therefore, when receiving the LCD interrupt instruction, if detecting an initialization complete identifier, the LCD controller may directly perform an operation in the following step B4.

It should be noted that the initialization complete identifier is used to uniquely identify that the initialization operation on the LCD screen is completed.

Step B4: The LCD controller sends an initialization complete message to a display module when initialization on the LCD screen is completed.

Step B5: When detecting that the touch area is greater than or equal to the area threshold, the TP touch module sends a touch complete message to a fingerprint module.

Step B6: When receiving the touch complete message, the fingerprint module forwards the touch complete message to the display module.

Step B7: When receiving the touch complete message and the initialization complete message, the display module illuminates a backlight of the LCD screen, and sends a fingerprint collection message to the fingerprint module.

In a current scenario, the backlight of the LCD screen is already in an illuminated state. Therefore, after receiving the touch complete message and the initialization complete message, if detecting an illumination identifier, the display module may directly send the fingerprint collection message to the fingerprint module.

It should be noted that the illumination identifier is used to uniquely identify that the backlight of the LCD screen is illuminated.

Step B8: When recognizing that the touch operation is a touch operation for fingerprint recognition, and receiving the fingerprint collection message, the fingerprint module collects fingerprint information in the fingerprint recognition region.

Step B9: The fingerprint module performs fingerprint verification based on the fingerprint information.

It should be noted that, for the operations in steps B2-B9, refer to the operations in steps A1-A8. Details are not described one by one in this embodiment of this application.

Step B10: When the fingerprint verification succeeds, the fingerprint module sends a fingerprint verification success message to a payment module.

Because the payment module can perform resource payment, when the fingerprint verification succeeds, the fingerprint module sends the fingerprint verification success message to the payment module.

Step B11: When receiving the fingerprint verification success message, the payment module performs a resource payment operation.

In this embodiment of this application, in the fingerprint unlocking process, the LCD interrupt instruction may be directly sent to the LCD controller when the touch operation is detected, so that the initialization operation on the LCD screen and the operation of detecting the touch area are performed at the same time, thereby shortening fingerprint unlocking duration, and improving fingerprint unlocking efficiency.

Figure 10A:
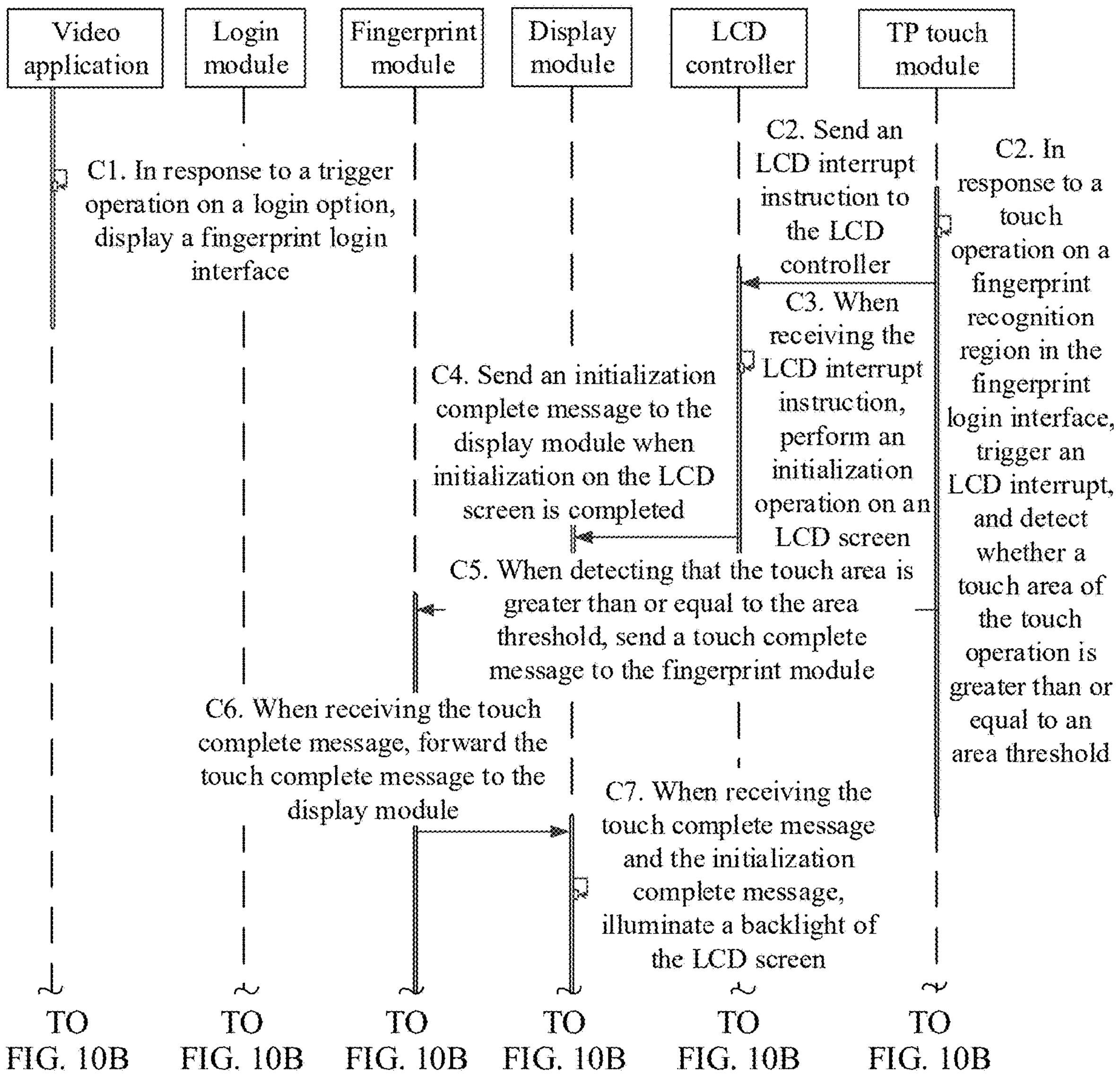
FIG. 10A and FIG. 10B are a schematic flowchart of a fingerprint unlocking method according to another example embodiment.
Figure 10B:
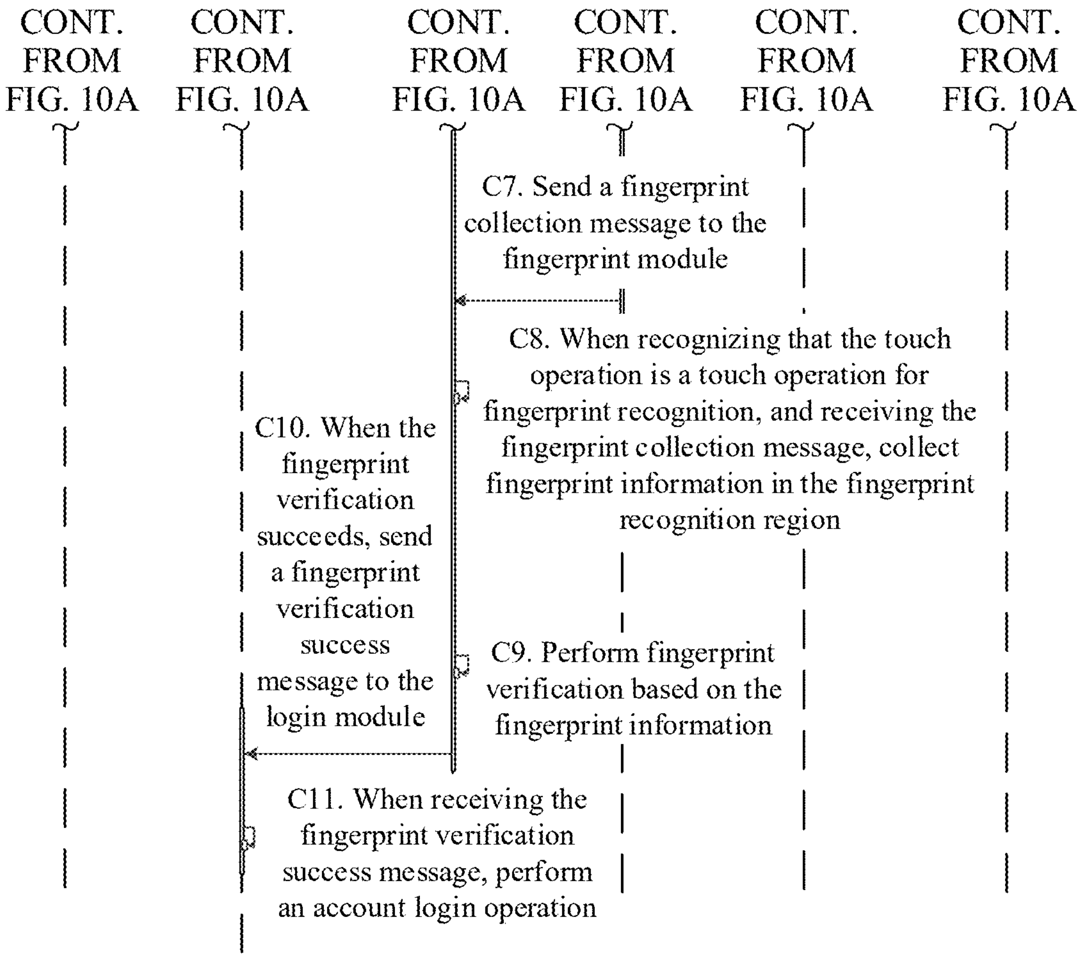

Reference is made to FIG. 10A and FIG. 10B. FIG. 10A and FIG. 10B are a schematic flowchart of a fingerprint unlocking method according to another example embodiment. In addition, in FIG. 10A and FIG. 10B, an example in which account login is performed through fingerprint recognition is used for description. As an example rather than a limitation, an example in which the method is applied to a mobile phone configured with a fingerprint unlocking function and the mobile phone is implemented through interaction between a plurality of modules shown in FIG. 3 is used for description herein. The method may include some or all of the following content:

Step C1: In response to a trigger operation on a login option, a video application displays a fingerprint login interface.

Sometimes, for the convenience of account login and efficiency of account login, a user may perform account login through fingerprint login. Therefore, in response to the trigger operation on the login option, the video application may display the fingerprint login interface, and a fingerprint recognition region is displayed in the fingerprint login interface.

It should be noted that in this embodiment of this application, the video application is only used as an example for description, and another application that has an account login function is also applicable to the operation provided in this embodiment of this application. Details are not described one by one in this embodiment of this application.

Step C2: In response to a touch operation on a fingerprint recognition region in the fingerprint login interface, a TP touch module triggers an LCD interrupt to send an LCD interrupt instruction to an LCD controller, and detects whether a touch area of the touch operation is greater than or equal to an area threshold.

Step C3: When receiving the LCD interrupt instruction, the LCD controller performs an initialization operation on an LCD screen.

It should be noted that a fingerprint recognition operation is performed when the fingerprint login interface is displayed, that is, the fingerprint recognition operation is performed when a display screen is illuminated. In this case, the LCD screen is already in an initialization complete state. Therefore, when receiving the LCD interrupt instruction, if detecting an initialization complete identifier, the LCD controller may directly perform an operation in the following step C4.

It should be noted that the initialization complete identifier is used to uniquely identify that the initialization operation on the LCD screen is completed.

Step C4: The LCD controller sends an initialization complete message to a display module when initialization on the LCD screen is completed.

Step C5: When detecting that the touch area is greater than or equal to the area threshold, the TP touch module sends a touch complete message to a fingerprint module.

Step C6: When receiving the touch complete message, the fingerprint module forwards the touch complete message to the display module.

Step C7: When receiving the touch complete message and the initialization complete message, the display module illuminates a backlight of the LCD screen, and sends a fingerprint collection message to the fingerprint module.

In a current scenario, the backlight of the LCD screen is already in an illuminated state. Therefore, after receiving the touch complete message and the initialization complete message, if detecting an illumination identifier, the display module may directly send the fingerprint collection message to the fingerprint module.

It should be noted that the illumination identifier is used to uniquely identify that the backlight of the LCD screen is illuminated.

Step C8: When recognizing that the touch operation is a touch operation for fingerprint recognition, and receiving the fingerprint collection message, the fingerprint module collects fingerprint information in the fingerprint recognition region.

Step C9: The fingerprint module performs fingerprint verification based on the fingerprint information.

It should be noted that, for the operations in step C2-step C9, refer to the operations in steps A1-A8. Details are not described one by one in this embodiment of this application.

Step C10: When the fingerprint verification succeeds, the fingerprint module sends a fingerprint verification success message to a login module.

Because the login module can implement account login, when the fingerprint recognition succeeds, the fingerprint module may send the fingerprint verification success message to the login module.

Step C11: When receiving the fingerprint verification success message, the login module performs an account login operation.

In this embodiment of this application, in the fingerprint unlocking process, the LCD interrupt instruction may be directly sent to the LCD controller when the touch operation is detected, so that the initialization operation on the LCD screen and the operation of detecting the touch area are performed at the same time, thereby shortening fingerprint unlocking duration, and improving fingerprint unlocking efficiency.

Figure 11A:
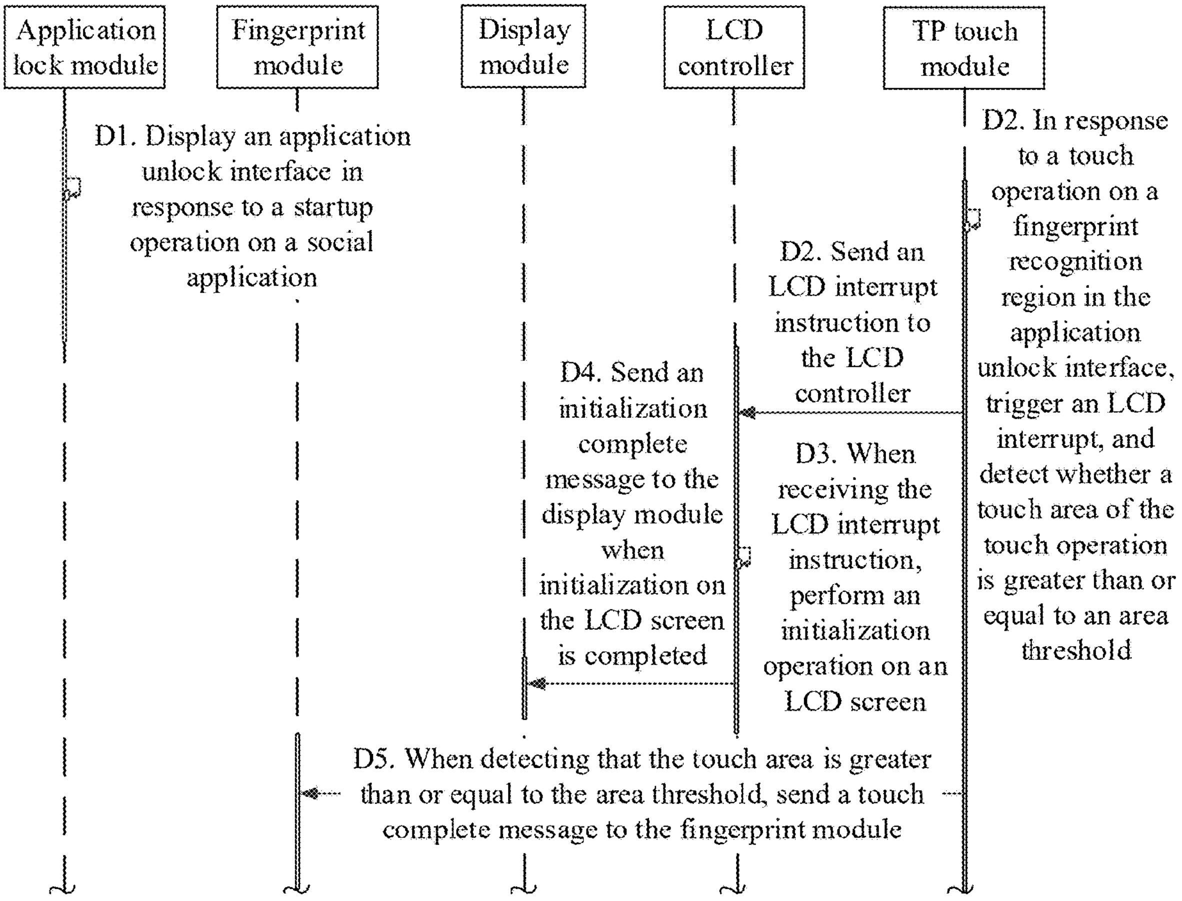
FIG. 11A and FIG. 11B are a schematic flowchart of a fingerprint unlocking method according to another example embodiment.
Figure 11B:
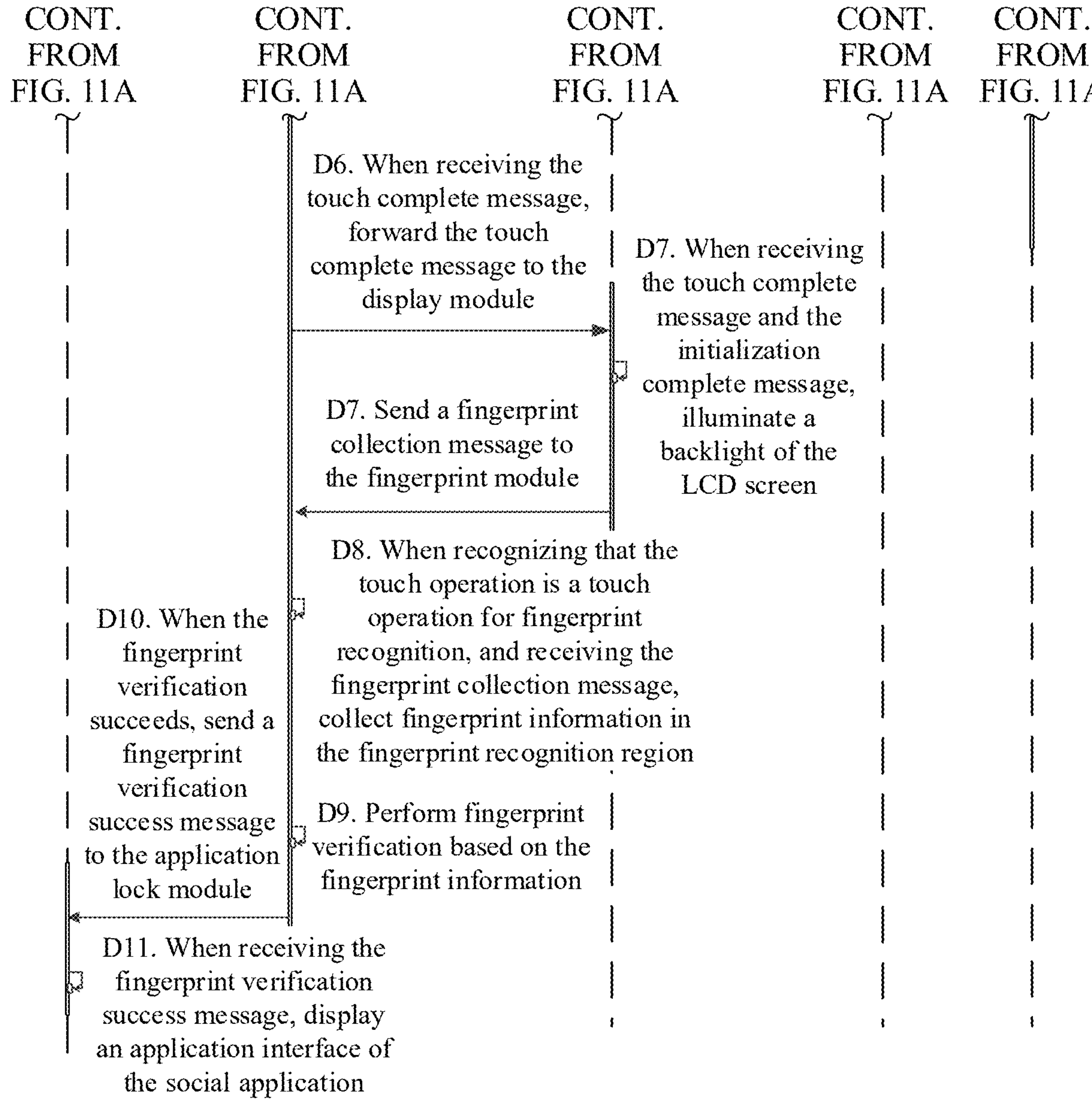

Reference is made to FIG. 11A and FIG. 11B. FIG. 11A and FIG. 11B are a schematic flowchart of a fingerprint unlocking method according to another example embodiment. In addition, in FIG. 11A and FIG. 11B, an example in which an application is started through fingerprint recognition is used for description. As an example rather than a limitation, an example in which the method is applied to a mobile phone configured with a fingerprint unlocking function and the mobile phone is implemented through interaction between a plurality of modules shown in FIG. 3 is used for description herein. The method may include some or all of the following content:

Step D1: An application lock module displays an application unlock interface in response to a startup operation on a social application.

Sometimes, for use security of an application, an application lock may be generally set for the application. For example, to avoid leakage of a chat record, a user may set an application lock for the social application. When the social application is started, if the social application is set with an application lock, the user needs to unlock the application lock of the social application, and when the unlocking succeeds, a mobile phone displays an application interface of the social application. Therefore, in response to the startup operation on the social application, the application lock module may display the application unlock interface, and a fingerprint recognition region may be displayed in the application unlock interface.

In some embodiments, the operation of displaying an application unlock interface by an application lock module in response to a startup operation on a social application includes the following: In response to the startup operation on the social application, the application lock module may interrupt display of the application interface of the social application, and display the application unlock interface.

As an example, the operation of interrupting display of the application interface of the social application by the application lock module includes the following: The application lock module overlays the application unlock interface on the application interface of the social application for display. Alternatively, the application lock module interrupts a startup procedure of the social application.

It should be noted that in this embodiment of this application, the social application is only used as an example for description, and another application that is set with an application lock is also applicable to the operation described in this embodiment of this application. Details are not described one by one in this embodiment of this application.

Step D2: In response to a touch operation on a fingerprint recognition region in the application unlock interface, a TP touch module triggers an LCD interrupt to send an LCD interrupt instruction to an LCD controller, and detects whether a touch area of the touch operation is greater than or equal to an area threshold.

Step D3: When receiving the LCD interrupt instruction, the LCD controller performs an initialization operation on an LCD screen.

It should be noted that a fingerprint recognition operation is performed when the application unlock interface is displayed, that is, the fingerprint recognition operation is performed when a display screen is illuminated. In this case, the LCD screen is already in an initialization complete state. Therefore, when receiving the LCD interrupt instruction, if detecting an initialization complete identifier, the LCD controller may directly perform an operation in the following step D4.

It should be noted that the initialization complete identifier is used to uniquely identify that the initialization operation on the LCD screen is completed.

Step D4: The LCD controller sends an initialization complete message to a display module when initialization on the LCD screen is completed.

Step D5: When detecting that the touch area is greater than or equal to the area threshold, the TP touch module sends a touch complete message to a fingerprint module.

Step D6: When receiving the touch complete message, the fingerprint module forwards the touch complete message to the display module.

Step D7: When receiving the touch complete message and the initialization complete message, the display module illuminates a backlight of the LCD screen, and sends a fingerprint collection message to the fingerprint module.

In a current scenario, the backlight of the LCD screen is already in an illuminated state. Therefore, after receiving the touch complete message and the initialization complete message, if detecting an illumination identifier, the display module may directly send the fingerprint collection message to the fingerprint module.

It should be noted that the illumination identifier is used to uniquely identify that the backlight of the LCD screen is illuminated.

Step D8: When recognizing that the touch operation is a touch operation for fingerprint recognition, and receiving the fingerprint collection message, the fingerprint module collects fingerprint information in the fingerprint recognition region.

Step D9: The fingerprint module performs fingerprint verification based on the fingerprint information.

It should be noted that, for the operations in step D2-step D9, refer to the operations in step A1-step A8. Details are not described one by one in this embodiment of this application.

Step D10: When the fingerprint verification succeeds, the fingerprint module sends a fingerprint verification success message to the application lock module.

The application lock module can perform a locking operation and an unlocking operation on the social application. Therefore, to unlock the social application, when the fingerprint verification succeeds, the fingerprint module may send the fingerprint verification success message to the application lock module.

Step D11: When receiving the fingerprint verification success message, the application lock module displays an application interface of the social application.

It may be learned from the foregoing description that the application lock module may lock the social application in different manners, that is, the application lock module may interrupt display of the application interface of the social application in different manners. Correspondingly, the application lock module may display the application interface of the social application in different manners.

As an example, when the application lock module locks the social application by overlaying a fingerprint recognition interface on the application interface of the social application for display, if the application lock module receives the fingerprint verification success message, the application lock module does not display the fingerprint recognition interface, to display the application interface of the social application.

As an example, when the application lock module locks the social application by interrupting a startup procedure of the social application, if the application lock module receives the fingerprint verification success message, the application lock module releases an interrupt operation on the startup procedure of the social application, so that the startup procedure of the social application continues, so as to display the application interface of the social application.

In this embodiment of this application, in the fingerprint unlocking process, the LCD interrupt instruction may be directly sent to the LCD controller when the touch operation is detected, so that the initialization operation on the LCD screen and the operation of detecting the touch area are performed at the same time, thereby shortening fingerprint unlocking duration, and improving fingerprint unlocking efficiency.

Figure 12:
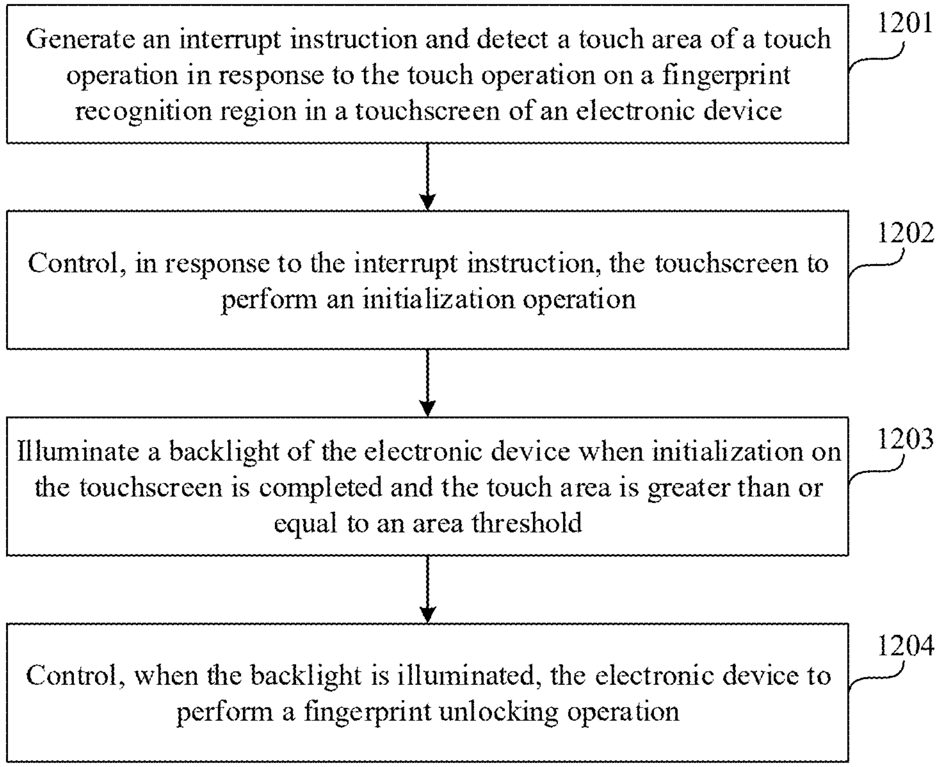
FIG. 12 is a schematic flowchart of a fingerprint unlocking method according to another example embodiment.

Reference is made to FIG. 12. FIG. 12 is a schematic flowchart of a fingerprint unlocking method according to another example embodiment. As an example rather than a limitation, herein, the method is applied to an electronic device. The method may include some or all of the following content:

Step 1201: Generate an interrupt instruction and detect a touch area of a touch operation in response to the touch operation on a fingerprint recognition region in a touchscreen of the electronic device.

In a process of using the electronic device, a scenario in which fingerprint recognition needs to be performed may exist. For example, a scenario in which a screen of the electronic device is unlocked may exist, a scenario in which resource payment is performed through fingerprint recognition may exist, a scenario in which account login is performed through fingerprint recognition may exist, a scenario in which an application is started through fingerprint recognition may exist, and the like. In these scenarios, a user may perform the touch operation on the fingerprint recognition region in the touchscreen of the electronic device. In this way, in response to the touch operation on the fingerprint recognition region in the touchscreen of the electronic device, the interrupt instruction is generated, and the touch area of the touch operation is detected.

It may be learned from the foregoing description that the electronic device may include a touchscreen touch module and a touchscreen controller. Therefore, as an example, the operation of generating an interrupt instruction and detecting a touch area of a touch operation in response to the touch operation on a fingerprint recognition region in a touchscreen of the electronic device includes: in response to the touch operation on the fingerprint recognition region in the touchscreen, generating, by the touchscreen touch module, the interrupt instruction, and detecting the touch area of the touch operation; and sending, by the touchscreen touch module, the interrupt instruction to the touchscreen controller.

In this way, when detecting the touch operation, the touchscreen touch module may send the interrupt instruction to the touchscreen controller, so that an occasion of sending the interrupt instruction is advanced, and an unlocking speed is increased.

It should be noted that the touchscreen touch module may be the TP touch module described above, the touchscreen controller may be the LCD controller described above, and the interrupt instruction may be the LCD interrupt instruction described above. This is not specifically limited in this embodiment of this application.

It should be further noted that the touch area of the touch operation is a contact area between a finger and the touchscreen of the electronic device when the finger of the user acts on the fingerprint recognition region.

As an example, the electronic device detects the touch area of the touch operation to detect whether the touch area is greater than or equal to the area threshold. Therefore, the operation of detecting a touch area of the touch operation by the electronic device includes: detecting a quantity of touch sensors touched by the touch operation in the fingerprint recognition region; and when the quantity of touch sensors is greater than or equal to a quantity threshold, determining that the touch area of the touch operation is greater than or equal to the area threshold.

It should be noted that the quantity threshold may be preset based on a requirement. For example, a minimum value of the quantity threshold may be a quantity required for implementing a fingerprint recognition function. The area threshold may also be preset based on a requirement, and a minimum value of the set area threshold is an area required for implementing a fingerprint recognition function.

It should be further noted that the operation of detecting a touch area of the touch operation by the electronic device may include not only the foregoing manner, but also another manner. For another manner, refer to the related technology. Details are not described one by one in this embodiment of this application.

It should be noted that, the quantity of touch sensors triggered in the fingerprint recognition region is detected, so that it can be determined whether the touch area is greater than or equal to the area threshold, thereby reducing complexity of detecting the touch area, and improving detection efficiency.

Step 1202: Control, in response to the interrupt instruction, the touchscreen to perform an initialization operation.

It may be learned from the foregoing description that the touchscreen touch module sends the interrupt instruction to the touchscreen controller. Therefore, when receiving the interrupt instruction, the touchscreen controller may perform the initialization operation on the touchscreen in response to the interrupt instruction.

In this way, when detecting the touch operation, the touchscreen touch module may send the interrupt instruction to the touchscreen controller. In this way, in a process in which the touchscreen touch module detects whether the touch area is greater than or equal to the area threshold, the touchscreen controller can perform the initialization operation on the touchscreen at the same time, thereby shortening time of waiting for the initialization operation on the touchscreen, and increasing a fingerprint unlocking speed.

It should be noted that, for the step of controlling the touchscreen to perform an initialization operation, refer to the foregoing step of performing an initialization operation on an LCD screen by the LCD controller. Details are not described one by one in this embodiment of this application.

Step 1203: Illuminate a backlight of the electronic device when initialization on the touchscreen is completed and the touch area is greater than or equal to an area threshold.

In some embodiments, when initialization on the touchscreen is completed and the touch area is greater than or equal to the area threshold, the electronic device may illuminate all mounted backlights and the like, or may illuminate backlights in some regions, for example, illuminate a backlight in a preset region. The preset region is at least one of the fingerprint recognition region and a frame region of the electronic device. The preset region may alternatively be the specific region described above. This is not specifically limited in this embodiment of this application.

It should be noted that, the backlight of the electronic device may be selectively illuminated, so that diversity of a backlight function is improved. In addition, because the screen of the electronic device does not need to be illuminated, power waste is reduced.

It may be learned from the foregoing description that the electronic device further includes a fingerprint module and a display module. Therefore, as an example, the operation of illuminating, by the electronic device, a backlight of the electronic device when initialization on the touchscreen is completed and the touch area is greater than or equal to an area threshold includes: when initialization on the touchscreen is completed, sending, by the touchscreen controller, an initialization complete message to the display module; when the touch area is greater than or equal to the area threshold, sending, by the touchscreen touch module, a touch complete message to the display module by using the fingerprint module; and when receiving the initialization complete message and the touch complete message, illuminating, by the display module, the backlight.

A premise of fingerprint recognition is that a touch area of a finger in the fingerprint recognition region meets a requirement, and a minimum value of the area threshold is an area required for implementing a fingerprint recognition function. Therefore, when the touch area is greater than or equal to the area threshold, the touchscreen touch module may send the touch complete message to the fingerprint module. In addition, when the touch area is greater than or equal to the area threshold, it indicates that the current touch operation is not a misoperation performed by the user on the screen of the electronic device, but requires fingerprint unlocking. In a fingerprint unlocking process, to prompt the user that the current touch operation is valid, the backlight may be further illuminated in the fingerprint unlocking process. Therefore, when receiving the touch complete message, the fingerprint module may forward the touch complete message to the display module.

The backlight can be illuminated only after initialization on the touchscreen is completed. Therefore, after initialization on the touchscreen is completed, the touchscreen controller may send the initialization complete message to the display module.

In a possible implementation, the touchscreen touch module may detect that the touch area is less than the area threshold. In this case, the touchscreen touch module may send a touch failure message to the touchscreen controller. When receiving the touch failure message, the touchscreen controller stops the initialization operation on the touchscreen if the initialization operation on the touchscreen is not completed.

When the touchscreen touch module detects that the touch area is less than the area threshold, it indicates that the user may accidentally touch the fingerprint recognition region, and is not intended to unlock the electronic device. Therefore, the touchscreen touch module may send a touch failure message to the touchscreen controller.

It should be noted that, the initialization operation on the touchscreen may be interrupted by sending the touch failure message to the touchscreen controller, so that fingerprint recognition is avoided in case of accidental touch by the user, thereby improving fingerprint recognition reliability.

In another possible implementation, when detecting that the touch area is less than the area threshold, the touchscreen touch module may not only send a touch failure message to the touchscreen controller, but also send a touch failure message to the fingerprint module. When receiving the touch failure message, the touchscreen controller stops the initialization operation on the touchscreen if the initialization operation on the touchscreen is not completed. When receiving the touch failure message, the fingerprint module may not make any response.

In another possible implementation, when detecting that the touch area is less than the area threshold, the touchscreen touch module may not send a touch failure message to any module.

Step 1204: Control, when the backlight is illuminated, the electronic device to perform a fingerprint unlocking operation.

In some embodiments, when the backlight is illuminated, fingerprint information in the fingerprint recognition region is collected. Fingerprint verification is performed based on the fingerprint information. The electronic device is controlled, based on a current state of the electronic device when the fingerprint verification succeeds, to perform an operation corresponding to a fingerprint unlocking function.

It may be learned from the foregoing description that the electronic device may include a display module and a fingerprint module, and the display module may illuminate the backlight. Therefore, when the backlight is illuminated, the display module may send a fingerprint collection message to the fingerprint module. When receiving the fingerprint collection message, the fingerprint module may collect fingerprint information in the fingerprint recognition region, and perform fingerprint verification based on the fingerprint information.

In some embodiments, not all types of touch operations may be used for fingerprint recognition. Therefore, when the backlight is illuminated, before the fingerprint information in the fingerprint recognition region is collected, the electronic device may further recognize a type of the touch operation. When the type of the touch operation is a touch operation for fingerprint recognition, the operation in step 1204 is performed.

It should be noted that the electronic device may recognize, by using the fingerprint module, whether the type of the touch operation is a touch operation for fingerprint recognition.

In some embodiments, when receiving the touch complete message, the fingerprint module may recognize, based on touch data carried in the touch complete message, whether the touch operation is a touch operation for fingerprint recognition.

In a fingerprint recognition process, the finger of the user is required to act in the fingerprint recognition region for specific duration. Otherwise, fingerprint recognition cannot be performed. Therefore, the touch data may include touch duration in which the touch operation is performed on the fingerprint recognition region.

It should be noted that, for a manner in which the fingerprint module recognizes the type of the touch operation based on the touch data, refer to the manner described in step A5. Details are not described one by one in this embodiment of this application.

It should be noted that, it is determined whether the touch operation is a touch operation for fingerprint recognition, thereby avoiding a misoperation of fingerprint recognition, and improving fingerprint recognition reliability.

In some embodiments, the operation of controlling, based on a current state of the electronic device when the fingerprint verification succeeds, the electronic device to perform an operation corresponding to a fingerprint unlocking function includes: when the fingerprint verification succeeds, if the electronic device is currently in a screen to-be-unlocked state, unlocking a screen of the electronic device; when the fingerprint verification succeeds, if the electronic device is currently in a resource to-be-paid state, performing a resource payment operation; when the fingerprint verification succeeds, if the electronic device is currently in an account to-be-logged-in state, performing an account login operation; or when the fingerprint verification succeeds, if the electronic device is currently in an application lock to-be-unlocked state, unlocking an application lock of a target application to display an application interface of the target application, where the target application is any application installed on the electronic device, the target application is set with the application lock and is currently in a to-be-started state, and the application lock is used to encrypt startup of the target application.

The fingerprint unlocking function may be applied to various scenarios. When the fingerprint verification succeeds, if the electronic device is in different states, operations performed by using the electronic device are also different. Therefore, when the fingerprint verification succeeds, the electronic device needs to perform the operation corresponding to the fingerprint unlocking function based on the current state of the electronic device.

It should be noted that, when the electronic device is in different states, the electronic device is controlled to perform different operations, thereby improving an application range and application richness of fingerprint unlocking.

In this embodiment of this application, in the fingerprint unlocking process, the interrupt instruction may be directly sent to the touchscreen controller when the touch operation is detected, so that the initialization operation on the touchscreen and the operation of detecting the touch area are performed at the same time, thereby shortening fingerprint unlocking duration, and improving fingerprint unlocking efficiency.

Figure 13:
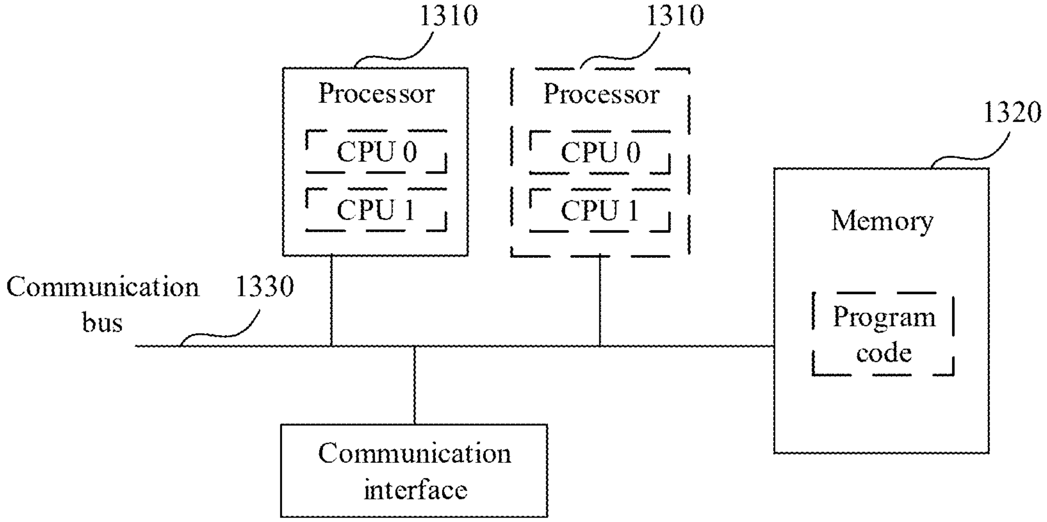
FIG. 13 is a schematic diagram of a structure of an electronic device according to another example embodiment.

FIG. 13 is a schematic diagram of a structure of another electronic device according to an embodiment of this application. Referring to FIG. 13, the structure of the electronic device includes a processor 1310 and a memory 1320. There may be one or more processors 1310. The memory 1310 is configured to: store a program that supports the electronic device in performing the fingerprint unlocking method provided in the foregoing embodiments, and store data used to implement the fingerprint unlocking method in the foregoing embodiments. The electronic device may further include a communication bus 1330, and the communication bus 1330 is configured to establish a connection between the processor 1310 and the memory 1320. The processor 1310 is configured to:

- generate an interrupt instruction and detect a touch area of a touch operation in response to the touch operation on a fingerprint recognition region in a touchscreen of the electronic device;
- control, in response to the interrupt instruction, the touchscreen to perform an initialization operation;
- illuminate a backlight of the electronic device when initialization on the touchscreen is completed and the touch area is greater than or equal to an area threshold; and
- control, when the backlight is illuminated, the electronic device to perform a fingerprint unlocking operation.

As an example of this application, the processor 1310 is further configured to:

- when initialization on the touchscreen is completed and the touch area is greater than or equal to the area threshold, illuminate a backlight in a preset region, where the preset region is at least one of the fingerprint recognition region and a frame region of the electronic device.

As an example of this application, the electronic device includes a touchscreen touch module and a touchscreen controller, and the processor 1310 is further configured to:

in response to the touch operation on the fingerprint recognition region in the touchscreen, generate, by the touchscreen touch module, the interrupt instruction, and detect the touch area of the touch operation; and send, by the touchscreen touch module, the interrupt instruction to the touchscreen controller.

As an example of this application, the processor 1310 is further configured to:

when receiving the interrupt instruction, perform, by the touchscreen controller, an initialization operation on the touchscreen in response to the interrupt instruction.

As an example of this application, the processor 1310 is further configured to:

when the touch area is less than the area threshold, send, by the touchscreen touch module, a touch failure message to the touchscreen controller; and when receiving the touch failure message, stop, by the touchscreen controller, the initialization operation on the touchscreen if the initialization operation on the touchscreen is not completed.

As an example of this application, the electronic device further includes a fingerprint module and a display module. The processor 1310 is further configured to:

when initialization on the touchscreen is completed, send, by the touchscreen controller, an initialization complete message to the display module;

when the touch area is greater than or equal to the area threshold, send, by the touchscreen touch module, a touch complete message to the display module by using the fingerprint module; and when receiving the initialization complete message and the touch complete message, illuminate, by the display module, the backlight.

As an example of this application, the processor 1310 is further configured to:

when the touch area is less than the area threshold, separately send, by the touchscreen touch module, a touch failure message to the touchscreen controller and the fingerprint module;

when receiving the touch failure message, stop, by the touchscreen controller, the initialization operation on the touchscreen if the initialization operation on the touchscreen is not completed; and when receiving the touch failure message, skip making, by the fingerprint module, any response.

As an example of this application, the processor 1310 is further configured to:

collect fingerprint information in the fingerprint recognition region when the backlight is illuminated;

perform fingerprint verification based on the fingerprint information; and control, based on a current state of the electronic device when the fingerprint verification succeeds, the electronic device to perform an operation corresponding to a fingerprint unlocking function.

As an example of this application, the processor 1310 is further configured to:

recognize a type of the touch operation; and when the type of the touch operation is a touch operation for fingerprint recognition, perform the operation of collecting fingerprint information in the fingerprint recognition region when the backlight is illuminated.

As an example of this application, the processor 1310 is further configured to:

when the fingerprint verification succeeds, if the electronic device is currently in a screen to-be-unlocked state, unlock a screen of the electronic device;

when the fingerprint verification succeeds, if the electronic device is currently in a resource to-be-paid state, perform a resource payment operation;

when the fingerprint verification succeeds, if the electronic device is currently in an account to-be-logged-in state, perform an account login operation; or when the fingerprint verification succeeds, if the electronic device is currently in an application lock to-be-unlocked state, unlock an application lock of a target application to display an application interface of the target application, where the target application is any application installed on the electronic device, the target application is set with the application lock and is currently in a to-be-started state, and the application lock is used to encrypt startup of the target application.

As an example of this application, the processor 1310 is further configured to:

detect a quantity of touch sensors touched by the touch operation in the fingerprint recognition region; and when the quantity of touch sensors is greater than or equal to a quantity threshold, determine that the touch area of the touch operation is greater than or equal to the area threshold.

In this embodiment of this application, in the fingerprint unlocking process, the interrupt instruction may be directly sent to the touchscreen controller when the touch operation is detected, so that the initialization operation on the touchscreen and the operation of detecting the touch area are performed at the same time, thereby shortening fingerprint unlocking duration, and improving fingerprint unlocking efficiency.

It should be noted that, when the electronic device provided in the foregoing embodiment performs fingerprint unlocking, division of the foregoing functional modules is merely used as an example for description. In actual application, the foregoing functions may be allocated to different functional modules based on a requirement for implementation, that is, an internal structure of the apparatus is divided into different functional modules, to complete all or some of the functions described above.

Functional units and modules in the foregoing embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely for the purpose of distinguishing between each other, and are not used to limit the protection scope of the embodiments of this application.

The electronic device provided in the foregoing embodiment belongs to a same concept as the embodiment of the fingerprint unlocking method. For specific working processes and achieved technical effects of the units and the modules in the foregoing embodiment, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer instructions are loaded and executed on a computer, all or some of procedures or functions according to the embodiments of this application are produced. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line (Digital Subscriber Line, DSL)) or a wireless manner (for example, infrared, wireless, or microwave). The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid state disk (Solid State Disk, SSD)), or the like.

The foregoing descriptions are merely optional embodiments provided in this application, but are not intended to limit this application. Any modification, equivalent replacement, and improvement made within the technical scope disclosed in this application shall fall within the protection scope of this application.

The invention claimed is:

1. A fingerprint unlocking method, applied to an electronic device, wherein the method comprises:

generating an interrupt instruction and detecting a touch area of a touch operation based on the touch operation on a fingerprint recognition region in a touchscreen of the electronic device, wherein generating the interrupt instruction comprises generating the interrupt instruction in a kernel layer of a software system of the electronic device;

determining the touch area of the touch operation, wherein the touch area of the touch operation is greater than or equal to an area threshold, wherein the interrupt instruction is generated based on the touch operation, and the touch area of the touch operation is determined based on the touch operation;

controlling, based on the interrupt instruction, the touchscreen to perform an initialization operation;

illuminating the touchscreen of the electronic device when initialization on the touchscreen is completed and the touch area is greater than or equal to the area threshold; and controlling, when the touchscreen is illuminated, the electronic device to perform a fingerprint unlocking operation.

2. The method according to claim 1, wherein the illuminating the touchscreen of the electronic device when initialization on the touchscreen is completed and the touch area is greater than or equal to the area threshold comprises:

when initialization on the touchscreen is completed and the touch area is greater than or equal to the area threshold, illuminating the touchscreen in a preset region, wherein the preset region is at least one of the fingerprint recognition region and a frame region of the electronic device.

3. The method according to claim 1, wherein the electronic device comprises a touchscreen touch module and a touchscreen controller; and the generating an interrupt instruction and detecting a touch area of a touch operation based on the touch operation on a fingerprint recognition region in a touchscreen of the electronic device comprises:

based on the touch operation on the fingerprint recognition region in the touchscreen, generating, by the touchscreen touch module, the interrupt instruction, and detecting the touch area of the touch operation; and sending, by the touchscreen touch module, the interrupt instruction to the touchscreen controller.

4. The method according to claim 3, wherein the controlling, based on the interrupt instruction, the touchscreen to perform an initialization operation comprises:

when receiving the interrupt instruction, performing, by the touchscreen controller, an initialization operation on the touchscreen based on the interrupt instruction.

5. The method according to claim 3, wherein after the generating an interrupt instruction and detecting a touch area of a touch operation based on the touch operation on a fingerprint recognition region in a touchscreen of the electronic device, the method further comprises:

when the touch area is less than the area threshold, sending, by the touchscreen touch module, a touch failure message to the touchscreen controller; and when receiving the touch failure message, stopping, by the touchscreen controller, the initialization operation on the touchscreen if the initialization operation on the touchscreen is not completed.

6. The method according to claim 3, wherein the electronic device further comprises a fingerprint module and a display module; and the illuminating the touchscreen of the electronic device when initialization on the touchscreen is completed and the touch area is greater than or equal to the area threshold comprises:

when initialization on the touchscreen is completed, sending, by the touchscreen controller, an initialization complete message to the display module;

when the touch area is greater than or equal to the area threshold, sending, by the touchscreen touch module, a touch complete message to the display module by using the fingerprint module; and when receiving the initialization complete message and the touch complete message, illuminating, by the display module, the touchscreen.

7. The method according to claim 6, wherein after the generating an interrupt instruction and detecting a touch area of a touch operation based on the touch operation on a fingerprint recognition region in a touchscreen of the electronic device, the method further comprises:

when the touch area is less than the area threshold, separately sending, by the touchscreen touch module, a touch failure message to the touchscreen controller and the fingerprint module;

when receiving the touch failure message, stopping, by the touchscreen controller, the initialization operation on the touchscreen if the initialization operation on the touchscreen is not completed; and when receiving the touch failure message, skipping making, by the fingerprint module, any response.

8. The method according to claim 1, wherein the controlling, when the touchscreen is illuminated, the electronic device to perform a fingerprint unlocking operation comprises:

collecting fingerprint information in the fingerprint recognition region when the touchscreen is illuminated;

performing fingerprint verification based on the fingerprint information; and controlling, based on a current state of the electronic device when the fingerprint verification succeeds, the electronic device to perform an operation corresponding to a fingerprint unlocking function.

9. The method according to claim 8, wherein before the collecting fingerprint information in the fingerprint recognition region when the touchscreen is illuminated, the method further comprises:

recognizing a type of the touch operation; and when the type of the touch operation is a touch operation for fingerprint recognition, performing the operation of collecting fingerprint information in the fingerprint recognition region when the touchscreen is illuminated.

10. The method according to claim 9, wherein the controlling, based on a current state of the electronic device when the fingerprint verification succeeds, the electronic device to perform an operation corresponding to the fingerprint unlocking function comprises:

when the fingerprint verification succeeds, if the electronic device is currently in a screen to-be-unlocked state, unlocking a screen of the electronic device;

when the fingerprint verification succeeds, if the electronic device is currently in a resource to-be-paid state, performing a resource payment operation;

when the fingerprint verification succeeds, if the electronic device is currently in an account to-be-logged-in state, performing an account login operation; or when the fingerprint verification succeeds, if the electronic device is currently in an application lock to-be-unlocked state, unlocking an application lock of a target application to display an application interface of the target application, wherein the target application is any application installed on the electronic device, the target application is set with the application lock and is currently in a to-be-started state, and the application lock is used to encrypt startup of the target application.

11. The method according to claim 1, wherein controlling, based on the interrupt instruction, the touchscreen to perform the initialization operation comprises:

controlling in the kernel layer, based on the interrupt instruction, the touchscreen to perform the initialization operation.

12. The method according to claim 1, wherein the interrupt instruction is transmitted in the kernel layer and not transmitted to a hardware abstraction layer.

13. The method according to claim 1, wherein the interrupt instruction is a hardware interrupt.

14. The method according to claim 1, wherein the initialization of the touchscreen comprising setting functions of the touchscreen.

15. An electronic device, wherein the electronic device comprises at least one processor, and the at least one processor is configured to invoke a computer program in memory to cause the electronic device to:

generate an interrupt instruction and detect a touch area of a touch operation based on the touch operation on a fingerprint recognition region in a touchscreen of the electronic device, wherein generating the interrupt instruction comprises: generating the interrupt instruction in a kernel layer of a software system of the electronic device;

determine the touch area of the touch operation, wherein the touch area of the touch operation is greater than or equal to an area threshold, wherein the interrupt instruction is generated based on the touch operation, and determining the touch area of the touch operation based on the touch operation;

control, based on the interrupt instruction, the touchscreen to perform an initialization operation;

illuminate the touchscreen of the electronic device when initialization on the touchscreen is completed and the touch area is greater than or equal to the area threshold; and control, when the touchscreen is illuminated, the electronic device to perform a fingerprint unlocking operation.

16. The electronic device according to claim 15, wherein controlling, based on the interrupt instruction, the touchscreen to perform the initialization operation comprises controlling in the kernel layer, based on the interrupt instruction, the touchscreen to perform the initialization operation.

17. The electronic device according to claim 15, wherein the interrupt instruction is transmitted in the kernel layer and not transmitted to a hardware abstraction layer.

18. A non-transitory computer-readable storage medium, wherein the computer-readable storage medium stores computer instructions, and when the computer instructions are run on an electronic device, the electronic device is enabled to: generate an interrupt instruction and detect a touch area of a touch operation based on the touch operation on a fingerprint recognition region in a touchscreen of the electronic device, wherein generating the interrupt instruction comprises:

generating the interrupt instruction in a kernel layer of a software system of the electronic device;

determining the touch area of the touch operation, wherein the touch area of the touch operation is greater than or equal to an area threshold, wherein the interrupt instruction is generated based on the touch operation, and determining the touch area of the touch operation based on the touch operation;

controlling, based on the interrupt instruction, the touchscreen to perform an initialization operation;

illuminating the touchscreen of the electronic device when initialization on the touchscreen is completed and the touch area is greater than or equal to the area threshold; and controlling, when the touchscreen is illuminated, the electronic device to perform a fingerprint unlocking operation.

19. The non-transitory computer-readable storage medium according to claim 18, wherein illuminating the touchscreen of the electronic device when initialization on the touchscreen is completed and the touch area is greater than or equal to the area threshold comprises:

when initialization on the touchscreen is completed and the touch area is greater than or equal to the area threshold, illuminating the touchscreen in a preset region, wherein the preset region is at least one of the fingerprint recognition region and a frame region of the electronic device.

20. The non-transitory computer-readable storage medium according to claim 18, wherein the electronic device comprises a touchscreen touch module and a touchscreen controller; and wherein generating the interrupt instruction and detecting the touch area of the touch operation based on the touch operation on the fingerprint recognition region in the touchscreen of the electronic device comprises:

based on the touch operation on the fingerprint recognition region in the touchscreen, generating, by the touchscreen touch module, the interrupt instruction, and detecting the touch area of the touch operation; and sending, by the touchscreen touch module, the interrupt instruction to the touchscreen controller.

* * * * *